(12) United States Patent
Popovici et al.

(10) Patent No.: US 9,397,579 B2
(45) Date of Patent: Jul. 19, 2016

(54) FULL-BRIDGE SWITCHING DC/DC CONVERTERS AND CONTROLLERS THEREOF

(71) Applicant: O2Micro Inc., Santa Clara, CA (US)

(72) Inventors: Catalin Popovici, San Jose, CA (US);
Alin Gherghescu, San Jose, CA (US);
Laszlo Lipcsei, Campbell, CA (US)

(73) Assignee: O2Micro Inc, Santa Clara, CA (US)

( * ) Notice: Subject to any disclaimer, the term of this patent is extended or adjusted under 35 U.S.C. 154(b) by 107 days.

(21) Appl. No.: 14/250,050

(22) Filed: Apr. 10, 2014

(65) Prior Publication Data

US 2014/0218973 A1 Aug. 7, 2014

Related U.S. Application Data

(63) Continuation-in-part of application No. 13/184,327, filed on Jul. 15, 2011, now Pat. No. 8,737,099.

(60) Provisional application No. 61/928,739, filed on Jan. 7, 2014.

(51) Int. Cl.
*H02M 3/335* (2006.01)
*H02M 1/00* (2006.01)

(52) U.S. Cl.
CPC ...... *H02M 3/33569* (2013.01); *H02M 3/33592* (2013.01); *H02M 2001/0032* (2013.01); *H02M 2001/0058* (2013.01); *Y02B 70/1475* (2013.01); *Y02B 70/1491* (2013.01); *Y02B 70/16* (2013.01)

(58) Field of Classification Search
CPC ............. H02M 3/33576; H02M 3/33569; H02M 3/33592; H02M 2001/0058; H02M 2001/0032

USPC .............. 363/17, 21.04, 21.05; 323/283
See application file for complete search history.

(56) References Cited

U.S. PATENT DOCUMENTS 4,646,217 A 2/1987 Baroni et al.
5,003,454 A 3/1991 Bruning
(Continued)

FOREIGN PATENT DOCUMENTS

DE 4105464 A1 10/1991
JP S6326626 B2 5/1988
(Continued)

OTHER PUBLICATIONS

Patrick Chiang et al.: "Switching Analysis of Synchronous Rectifier MOSFETs With Phase-Shifted Full-Bridge Converter," dated Oct. 11, 2007 (16 pages).
(Continued)

*Primary Examiner* — Timothy J Dole
*Assistant Examiner* — Htet Z Kyaw

(57) ABSTRACT

A controller for a DC/DC converter controls a first, second, third, and fourth switches according to pulse signals generated alternately. The controller turns off the third switch on detection of a first edge of a first pulse signal, turns on the first switch after a delay from the detection of the first edge, turns off the fourth switch on detection of a second edge of the first pulse signal, turns on the second switch after a delay from the detection of the second edge, turns off the first switch on detection of a third edge of a second pulse signal, turns on the third switch after a delay from the detection of the third edge, turns off the second switch on detection of a fourth edge of the second pulse signal, and turns on the fourth switch after a delay from the detection of the fourth edge.

15 Claims, 11 Drawing Sheets

(56) References Cited

U.S. PATENT DOCUMENTS

| | | | |
|---|---|---|---|
| 5,331,533 A | 7/1994 | Smith | |
| 5,541,827 A * | 7/1996 | Allfather | H02M 3/33576 363/17 |
| 5,612,609 A | 3/1997 | Choi | |
| 5,838,558 A * | 11/1998 | Tan | H02M 3/3376 363/17 |
| 5,872,705 A | 2/1999 | Loftus et al. | |
| 5,920,475 A | 7/1999 | Boylan et al. | |
| 6,009,005 A * | 12/1999 | Kim | H02M 3/33507 363/131 |
| 6,501,234 B2 * | 12/2002 | Lin | H02J 1/14 315/209 R |
| 6,961,253 B1 | 11/2005 | Cohen | |
| 7,602,620 B2 * | 10/2009 | Lipcsei | H02M 3/33592 363/15 |
| 7,741,827 B2 | 6/2010 | Allinder et al. | |
| 7,965,046 B2 * | 6/2011 | Chiou | H05B 41/2824 315/194 |
| 8,125,799 B2 | 2/2012 | Zhu et al. | |
| 8,335,091 B2 * | 12/2012 | Greenfeld | H02M 3/3376 363/132 |
| 8,923,021 B2 * | 12/2014 | Ren | H02M 1/36 363/21.12 |
| 9,071,149 B2 * | 6/2015 | Kinjou | H02M 3/33507 |
| 9,166,490 B2 * | 10/2015 | Yu | H02M 3/3376 |
| 2003/0142513 A1 * | 7/2003 | Vinciarelli | H02J 1/102 363/17 |
| 2004/0223351 A1 | 11/2004 | Kurokami | |
| 2005/0128772 A1 | 6/2005 | Choi et al. | |
| 2007/0210772 A1 * | 9/2007 | Sawtell | H02M 3/156 323/282 |
| 2008/0310191 A1 | 12/2008 | Zhu et al. | |
| 2010/0132757 A1 * | 6/2010 | He | H02M 3/156 136/244 |

FOREIGN PATENT DOCUMENTS

| | | |
|---|---|---|
| JP | H0359667 B2 | 9/1991 |
| JP | 2003018840 A | 1/2003 |
| JP | 2004140913 A | 5/2004 |
| JP | 2009095091 A | 4/2009 |
| JP | 2010011625 A | 1/2010 |
| JP | 2010124524 A | 6/2010 |

OTHER PUBLICATIONS

Dongguk University, Master's thesis (A study on high efficiency half-bridge converter using synchronous rectifier), published in Dec. 1998.

English translation for Japanese Office Action issued in Japanese Patent Application No. 2014-112501, mailed Aug. 3, 2015.

* cited by examiner

US 9,397,579 B2

FULL-BRIDGE SWITCHING DC/DC CONVERTERS AND CONTROLLERS THEREOF

RELATED APPLICATIONS

This application is a continuation-in-part of U.S. patent application Ser. No. 13/184,327, filed on Jul. 15, 2011, and claims priority to U.S. Provisional Application Ser. No. 61/928,739, filed on Jan. 17, 2014, both of which are hereby incorporated by reference in their entirety.

BACKGROUND

FIG. 1 shows a block diagram of a conventional direct-current to direct-current (DC/DC) converter 100. The DC/DC converter 100 includes a half-bridge switching circuit having two switches SW1 and SW2, a transformer circuit 102, and a rectifying circuit 104. The states of the switches SW1 and SW2 in the half-bridge switching circuit are controlled by a PWM driving signal DRV to selectively transfer an input power from a terminal VDC to the transformer circuit 102. The transformer circuit 102 includes a transformer T, an inductor LM, and a filtering circuit consisting of a capacitor CR and an inductor LR. The transformer T receives the input power via the switches SW1 and SW2, and converts the input power to output power. Moreover, a primary current is generated through the primary winding of the transformer T, and magnetically, a secondary current is generated through the secondary winding of the transformer T. The rectifier 104 rectifies the secondary current and provides the output power, indicated by the secondary current, to a load 106.

When switching on or switching off a switch, there will be switching losses. By way of example, when a switch receives a driving signal to be turned on, a voltage across the switch decreases toward zero over a first period of time, and a current flowing through the switch increases toward a certain current level over a second period of time that overlaps the first period of time. Therefore, power can be consumed during the turning on of the switch; and similarly, power can be consumed during the turning off of the switch. This kind of power loss can be referred to as "switching loss".

In a conventional design, the driving signal DRV provided to drive the switches in the DC/DC converter 100 has a fixed frequency, and thus the switches are turned on and off at the fixed frequency whether the DC/DC converter 100 is powering a heavy load or a light load. However, it is unnecessary to switch the switches on and off if the DC/DC converter 100 provides power to a light load. Thus, under light load conditions, power is unnecessarily consumed and the power conversion efficiency is reduced due to switching losses.

Additionally, a turn-on delay exists between the time when a driving signal is generated to turn on a switch and the time when the switch is fully turned on, and a turn-off delay also exists between the time when a driving signal is generated to turn off the switch and the time when the switch is fully turned off. These delays may be caused by non-ideality of the switch and/or associated circuitry such as a driver (not shown) that drives the switch. If the DC/DC converter 100 is powering a light load, the DC/DC converter 100 may reduce an ON time, i.e., a pulse width, of the driving signal DRV to a relatively small value which is comparable to the delays. Similarly, if the DC/DC converter 100 is powering a heavy load, the DC/DC converter 100 may increase the pulse width of the driving signal DRV so that an OFF time, i.e., the time during which the driving signal DRV is logic low, is relatively small and comparable to the delays. As a result, the ON time or the OFF time may not be long enough to turn on or off the switches SW1 and SW2 properly.

Furthermore, drivers (not shown) that control the switches SW1 and SW2 may have different time delays, which causes the switches SW1 and SW2 to be on at the same time. If the switches SW1 and SW2 are on at the same time, then the power source at the terminal VDC is short-circuited to ground via the switches SW1 and SW2, and the switches SW1 and SW2 suffer a large current pulse. This may cause damage to the power source and the switches SW1 and SW2. A power converter that addresses these shortcomings would be beneficial.

SUMMARY

In one embodiment, a controller for a DC/DC converter includes a signal generator and control circuitry. The signal generator generates a first pulse signal and a second pulse signal alternately. The control circuitry controls a set of switches including a first switch, a second switch, a third switch, and a fourth switch according to the first and second pulse signals. The controller turns off the third switch on detection of a first edge of the first pulse signal and turns on the first switch after a predetermined delay from the detection of the first edge; turns off the fourth switch on detection of a second edge of the first pulse signal and turns on the second switch after a predetermined delay from the detection of the second edge; turns off the first switch on detection of a third edge of the second pulse signal and turns on the third switch after a predetermined delay from the detection of the third edge; and turns off the second switch on detection of a fourth edge of the second pulse signal and turns on the fourth switch after a predetermined delay from the detection of the fourth edge.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments according to the present invention provide DC/DC converters, including conversion circuitry for converting input power to output power, and controllers for controlling the power conversion. In an embodiment, a controller includes a signal generator that generates PWM (Pulse Width Modulation) signals, and a logic circuit that provides driving signals based on the PWM signals. The driving signals can drive multiple switches in the conversion circuitry to control the power conversion. As detailed in the following description, a DC/DC converter according to the present invention can overcome the shortcomings in the conventional DC/DC converter 100.

Figure 2:
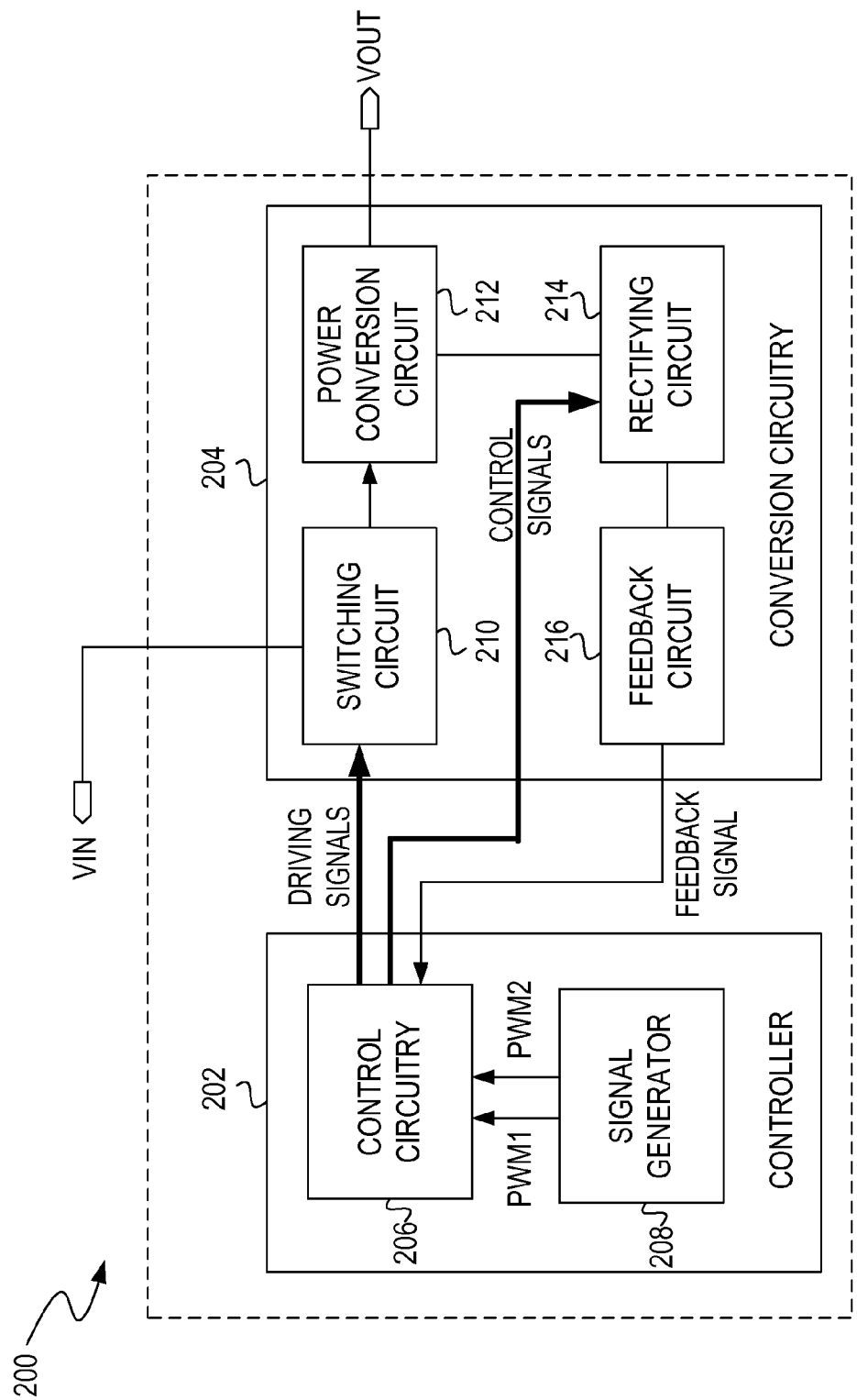
FIG. 2 illustrates a block diagram of an example of a power converter, in an embodiment according to the present invention.

FIG. 2 illustrates a block diagram of an example of a DC/DC converter 200, in an embodiment according to the present invention. The DC/DC converter 200 can be a transformer-based DC/DC converter (hereinafter referred to as DC/DC converter 200). As shown in FIG. 2, the DC/DC converter 200 includes a controller 202 and conversion circuitry 204.

The controller 202 includes control circuitry (e.g., logic circuitry) 206 and a signal generator 208. The signal generator 208 generates multiple pulse signals such as PWM signals, e.g., including signals PWM1 and PWM2, to the control circuitry 206. The control circuitry 206, at least based on the signals PWM1 and PWM2, provides a set of driving signals to the conversion circuitry 204 to control the power conversion.

The conversion circuitry 204 includes a switching circuit 210 and a power conversion circuit 212. The switching circuit 210 includes multiple switches that selectively transmit an input power received from an input terminal VIN to the power conversion circuit 212. The power conversion circuit 212 converts the input power to output power and delivers the output power to an energy consuming device, e.g., a load, via an output terminal VOUT. The driving signals provided from the controller 202 can control the states of the switches in the switching circuit 210, to control the amount of power transmitted to the power conversion circuit 212.

In the FIG. 2 embodiment, the conversion circuitry 204 also includes a rectifying circuit 214 coupled to or included in the power conversion circuit 212, and a feedback circuit 216 coupled between the control circuitry 206 and the power conversion circuit 212 via the rectifying circuit 214. The feedback circuit 216 detects the power conversion process and provides a feedback signal to the control circuitry 206 accordingly. The control circuitry 206 further provides a set of control signals, in response to the feedback signal, to control the rectifying circuit 214. Details of the controlling for the rectifying circuit 214 will be illustrated in the following description.

Figure 3:
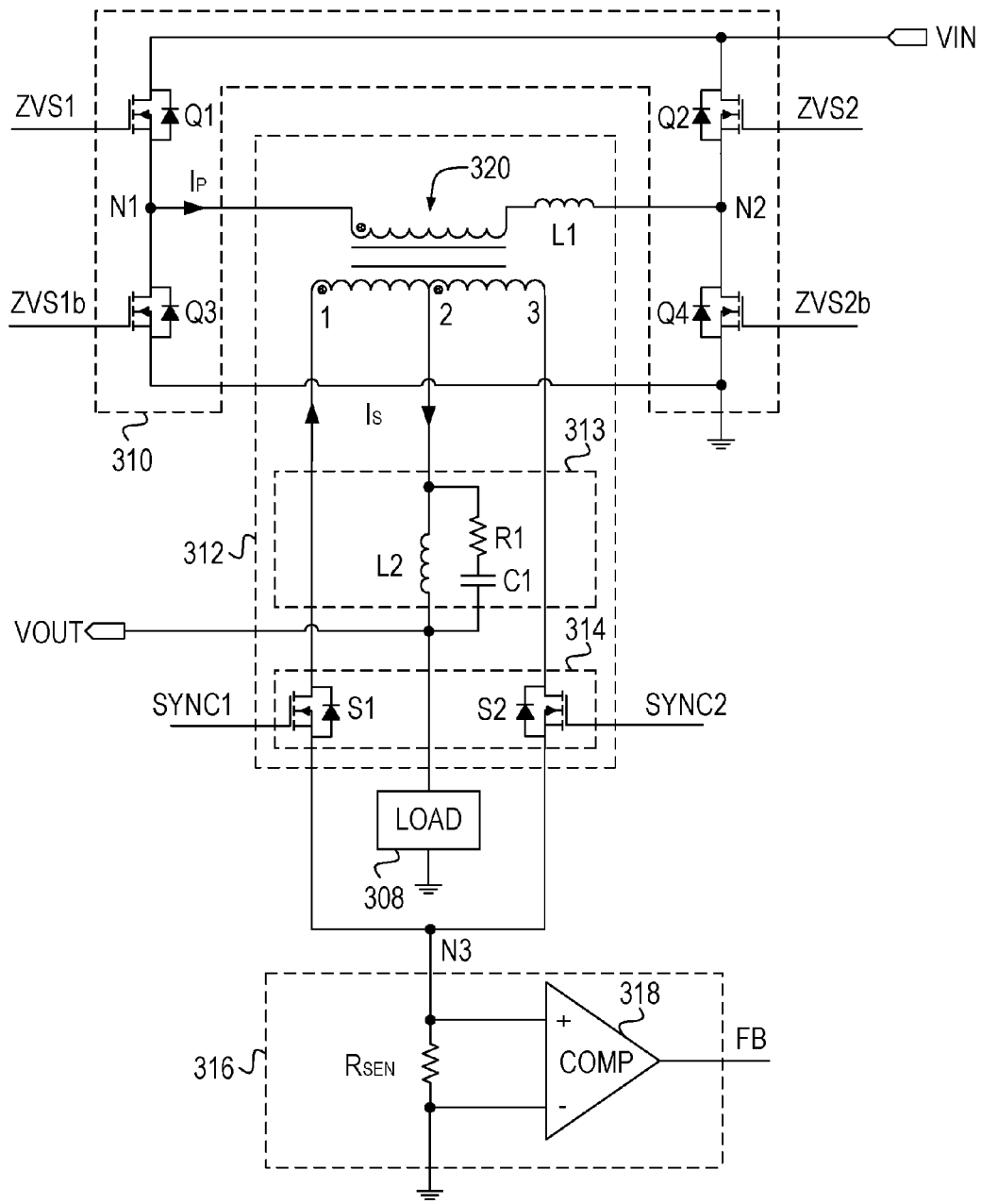
FIG. 3 illustrates a circuit diagram of an example of a conversion circuitry, in an embodiment according to the present invention.

FIG. 3 illustrates a circuit diagram of an example of a conversion circuitry 300, in an embodiment according to the present invention. FIG. 3 is described in combination with FIG. 2, and elements that are labeled the same as in FIG. 2 have similar functions. The conversion circuitry 300 is one embodiment of the conversion circuitry 204 in FIG. 2. The conversion circuitry 300 includes a switching circuit 310, a power conversion circuit 312, and a feedback circuit 316, which are examples of the circuits 210, 212 and 216 in FIG. 2.

In the FIG. 3 embodiment, the switching circuit 310 is embodied as a full-bridge switching circuit including a first pair of switches: a first high-side switch Q1 and a first low-side switch Q3; and a second pair of switches: a second high-side switch Q2 and a second low-side switch Q4. A controller, e.g., the controller 202 shown in FIG. 2, can provide driving signals ZVS1, ZVS1b, ZVS2, and ZVS2b to control the switches Q1, Q2, Q3, and Q4, respectively. Each driving signal ZVS1, ZVS1b, ZVS2, or ZVS2b can have a turn-on status (e.g., logic high or logic low) to turn on a corresponding switch Q1, Q2, Q3, or Q4 and have a turn-off status (e.g., logic low or logic high) to turn off the corresponding switch. Full-bridge switching circuits are well known in the art and thus a detailed description of them and their functionality is omitted here for simplicity.

In the FIG. 3 embodiment, the power conversion circuit 312 includes a transformer circuit 320 and an inductor L1. The transformer circuit 320 is coupled between a connection node N1 of the switches Q1 and Q3 and a connection node N2 of the switches Q2 and Q4. The transformer circuit 320 includes a primary winding and a center-tapped secondary winding. The inductor L1 is coupled in series to the primary winding of the transformer circuit 320 and can ramp (e.g., ramp up or ramp down) the current flowing through the primary winding of the transformer circuit 320. In one embodiment, when the input power is transmitted to the transformer circuit 320, a primary current $I_P$ is generated through the primary winding of the transformer circuit 320, and magnetically, a secondary current $I_S$ is generated through the secondary winding of the transformer circuit 320 to provide power for a load 308.

In one embodiment, the driving signals ZVS1, ZVS1b, ZVS2, and ZVS2b control the switches Q1-Q4 such that the power conversion circuit 312 alternately operates in a power receive mode and a power conserve mode. In the power receive mode, the primary winding of the transformer circuit 320 and the inductor L1 receive power from the input terminal VIN. Accordingly, the primary current $I_P$ ramps up or down to induce a varying magnetic field in the core of the transformer circuit 320, and therefore induces a voltage across the secondary winding of the transformer 320 and induces an increasing secondary current $I_S$ through the secondary winding to power the load 308. In the power conserve mode, the primary winding of the transformer circuit 320 and the inductor L1 neither receive power nor release power. Accordingly, the primary current $I_P$ remains approximately constant to maintain the magnetic field in the core of the transformer circuit 320 and the secondary current $I_S$ continues to power the load 308, and therefore the secondary current $I_S$ decreases.

More specifically, in one embodiment, the switches Q1-Q4 can be metal-oxide-semiconductor field-effect transistors (MOSFETs), and each of the switches Q1-Q4 includes a body diode. The body diodes of the switches Q1 and Q2 have cathodes coupled to the input terminal VIN, and have anodes coupled to ground through the switches Q3 and Q4 respectively. The body diodes of the switches Q3 and Q4 have cathodes coupled to the input terminal VIN through the switches Q1 and Q2 respectively, and have anodes coupled to ground.

On one hand, if the primary winding and the inductor L1 are electrically connected between the input terminal VIN and ground through the switch Q1, Q2, Q3, or Q4 or through a forward-biased body diode of the switches Q1-Q4, then the primary winding and the inductor L1 receives power from the input terminal VIN, and the power conversion circuit 312 operates in the power receive mode.

The situations in which the power conversion circuit 312 operates in the power receive mode include, but are not limited to, the following: (a1) the switches Q1 and Q4 are turned on, and the switches Q2 and Q3 are turned off; and (a2) the switches Q2 and Q3 are turned on, and the switches Q1 and Q4 are turned off. In situations (a1) and (a2), there can be an increasing primary current $I_P$ flowing from the input terminal VIN to ground through the primary winding and the turned-on switches (e.g., Q1 and Q4, or Q2 and Q3), or there can be a decreasing primary current $I_P$ flowing from ground to the input terminal VIN through the primary winding and the turned-on switches. The situations in which the power conversion circuit 312 operates in the power receive mode can also include, but are not limited to, the following: (a3) the switch Q1 is turned on, the switches Q2-Q4 are off, and the body diode of the switch Q4 is forward biased; (a4) the switch Q2 is turned on, the switches Q1, Q3 and Q4 are off, and the body diode of the switch Q3 is forward biased; (a5) the switch Q3 is turned on, the switches Q1, Q2 and Q4 are off, and the body diode of the switch Q2 is forward biased; (a6) the switch Q4 is turned on, the switches Q1, Q2 and Q3 are off, and the body diode of the switch Q1 is forward biased; and (a7) the switches Q1-Q4 are turned off, and the body diodes of the switches Q1 and Q4 or the body diodes of the switches Q2 and Q3 are forward biased. In situations (a3)-(a7), there can be a decreasing primary current $I_P$ flowing from ground to the input terminal VIN through the primary winding, a turned-on switch, and/or one or two forward biased body diodes.

On the other hand, if the primary winding and the inductor L1 constitute a circuit loop with one or two of the switches Q1-Q4, and/or one or two body diodes of the switches Q1-Q4, then the primary winding and the inductor L1 do not receive power and barely release power, and the power conversion circuit 312 operates in the power conserve mode.

The situations in which the power conversion circuit 312 operates in the power conserve mode include, but are not limited to, the following: (b1) the switches Q1 and Q2 are turned on, and the switches Q3 and Q4 are turned off; (b2) the switches Q3 and Q4 are turned on, and the switches Q1 and Q2 are turned off; (b3) the switch Q1 is turned on, the switches Q2-Q4 are off, and the body diode of the switch Q2 is forward biased; (b4) the switch Q2 is turned on, the switches Q1, Q3 and Q4 are off, and the body diode of the switch Q1 is forward biased; (b5) the switch Q3 is turned on, the switches Q1, Q2 and Q4 are off, and the body diode of the switch Q4 is forward biased; and (b6) the switch Q4 is turned on, the switches Q1, Q2 and Q3 are off, and the body diode of the switch Q3 is forward biased. In situations (b1)-(b6), a voltage across the primary winding and the inductor L1 is approximately zero, and there can be an approximately constant primary current $I_P$ flowing through the circuit loop, e.g., through the primary winding, the inductor L1, a forward biased body diode, and/or one or two turned-on switches.

As used herein, "the primary winding of the transformer circuit 320 and the inductor L1 neither receive power nor release power" means that the primary winding and the inductor L1 are in a circuit loop that does not include a power source, and that the circuit loop consumes negligible power. In the circuit loop, power consumed by a turned-on switch Q1, Q2, Q3, or Q4 and/or consumed by a body diode of a switch Q1, Q2, Q3, or Q4 is relatively small and can be omitted. As used herein, "approximately constant primary current $I_P$" means that, in the power conserve mode, the primary current $I_P$ may vary due to a voltage $V_{RON}$ across an on-resistor of a switch Q1, Q2, Q3, or Q4 and/or a forward biased voltage $V_{DIODE}$ across a body diode of a switch Q1, Q2, Q3, or Q4. However, the voltages $V_{RON}$ and $V_{DIODE}$ are relatively small and considered to be zero, and therefore the variation of the primary current $I_P$ can be neglected.

Accordingly, in one embodiment, the driving signals ZVS1, ZVS1b, ZVS2, and ZVS2b can control the time duration for the power receive mode (hereinafter, power receive period $T_{PR}$) and the time duration for the power conserve mode (hereinafter, power conserve period $T_{PC}$) to control an output voltage $V_{OUT}$ at the output terminal VOUT of the conversion circuitry 300. By way of example, the driving signals ZVS1, ZVS1b, ZVS2, and ZVS2b can prolong the power receive period $T_{PR}$ or shorten the power conserve period $T_{PC}$ to increase the output voltage $V_{OUT}$. The driving signals ZVS1, ZVS1b, ZVS2, and ZVS2b can also shorten the power receive period $T_{PR}$ or prolong the power conserve period $T_{PC}$ to decrease the output voltage $V_{OUT}$.

In the embodiment of FIG. 3, the power conversion circuit 312 also includes a filtering circuit 313 and a rectifying circuit 314. The filtering circuit 313 includes an inductor L2, a capacitor C1, and a resistor R1. The rectifying circuit 314 includes rectifying switches S1 and S2 coupled to the secondary winding of the transformer circuit 320 to rectify power from the secondary winding to the load. By way of example, if the primary current $I_P$ flows from the connection node N1 to the connection node N2 in the power receive mode, then the rectifying switch S1 is turned off and the rectifying switch S2 is turned on; and if the primary current $I_P$ flows from the connection node N2 to the connection node N1 in the power receive mode, then the rectifying switch S1 is turned on and the rectifying switch S2 is turned off. Hence, the rectifying circuit 314 can control a secondary current $I_S$ to flow from the secondary winding to the load 308 no matter what the direction of the primary current $I_P$ is. A controller, e.g., the controller 202 shown in FIG. 2, can provide control signals SYNC1 and SYNC2 to the switches S1 and S2 respectively to control the state of each switch.

The feedback circuit 316 includes a sensing resistor $R_{SEN}$ and a comparator 318. The sensing resistor $R_{SEN}$ is coupled between the rectifying circuit 314 and ground, and senses the secondary current $I_S$. Two terminals of the sensing resistor $R_{SEN}$ are coupled respectively to two input terminals of the comparator 318. For example, the non-inverting terminal of the comparator 318 is coupled to a terminal of the sensing resistor $R_{SEN}$ and the rectifying circuit 314, and the inverting terminal of the comparator 318 is coupled to the other terminal of the sensing resistor $R_{SEN}$ and ground. Although the sensing resistor $R_{SEN}$ disclosed in FIG. 3 is coupled between the rectifying circuit 314 and ground, this is not intended to limit the invention. In one embodiment, the sensing resistor $R_{SEN}$ can be coupled to the components in the conversion circuitry 300 in various manners as long as the secondary current $I_S$ can flow through the sensing resistor $R_{SEN}$. For example, the sensing resistor $R_{SEN}$ can be coupled between the filtering circuit 313 and the secondary winding, or between the filtering circuit 313 and the load 308.

In one embodiment, to power the load 308, the secondary current $I_S$ is generated and flows to the load 308. For example, the secondary current $I_S$ flows from the secondary winding of the transformer 320, through the inductor L2, to the load 308. If a boost-back condition occurs, e.g., the secondary current $I_S$ flows in a reverse direction from the load 308 to ground through the inductor L2, the secondary winding, and the sensing resistor $R_{SEN}$, then the comparator 318 outputs a pulse signal, e.g., a feedback signal FB, based on the input signals at the terminals of the sensing resistor $R_{SEN}$. The feedback signal FB is provided to a logic circuit, e.g., the control circuitry 206 in FIG. 2, and the logic circuit controls the control signals SYNC1 and SYNC2 to turn off the switches S1 and S2 in response to the feedback signal FB. In one embodiment, the boost-back condition, e.g., a reverse secondary current $I_S$, can cause damage to the power conversion circuit 312. Advantageously, the power conversion circuit 312 is open-circuited on detection of the boost-back condition, so as to protect the conversion circuitry 300 from damage due to the reverse secondary current $I_S$.

Figure 4:
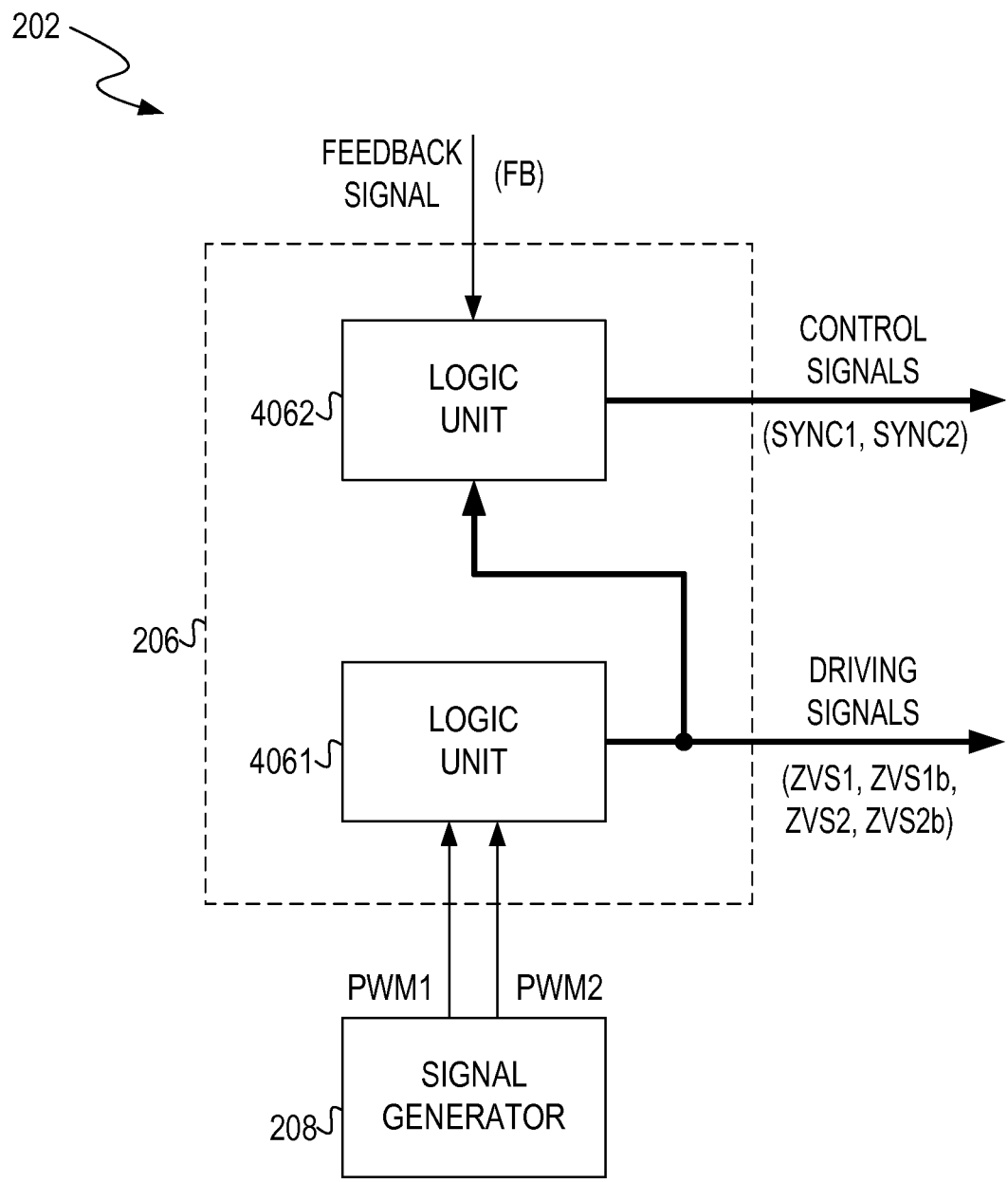
FIG. 4 illustrates a block diagram of an example of a controller, in an embodiment according to the present invention.

FIG. 4 illustrates a block diagram of an example of the controller 202 in FIG. 2, in an embodiment according to the present invention. FIG. 4 is described in combination with FIG. 2 and FIG. 3, and elements that are labeled the same as in FIG. 2 and FIG. 3 have similar functions.

As described in relation to FIG. 2, the controller 202 includes the control circuitry 206 and the signal generator 208, and the signal generator 208 provides a group of pulse signals, e.g., signals PWM1 and PWM2, to control the output signals of the control circuitry 206. In the FIG. 4 embodiment, the control circuitry 206 includes a first logic unit 4061 and a second logic unit 4062. The signals PWM1 and PWM2 are provided to the first logic unit 4061, and the first logic unit 4061 outputs a set of driving signals, e.g., the driving signals ZVS1, ZVS1b, ZVS2, and ZVS2b in FIG. 3, based on the signals PWM1 and PWM2. Furthermore, the second logic unit 4062 receives a feedback signal, e.g., the feedback signal FB provided by the feedback circuit 316 of the conversion circuitry 300 in FIG. 3, and provides a set of control signals, e.g., the control signals SYNC1 and SYNC2 in FIG. 3, based on the feedback signal and the driving signals. The logical relationships between the signals, the driving signals, the control signals, and the feedback signal will be described in more detail in the following paragraphs.

Figure 5A:
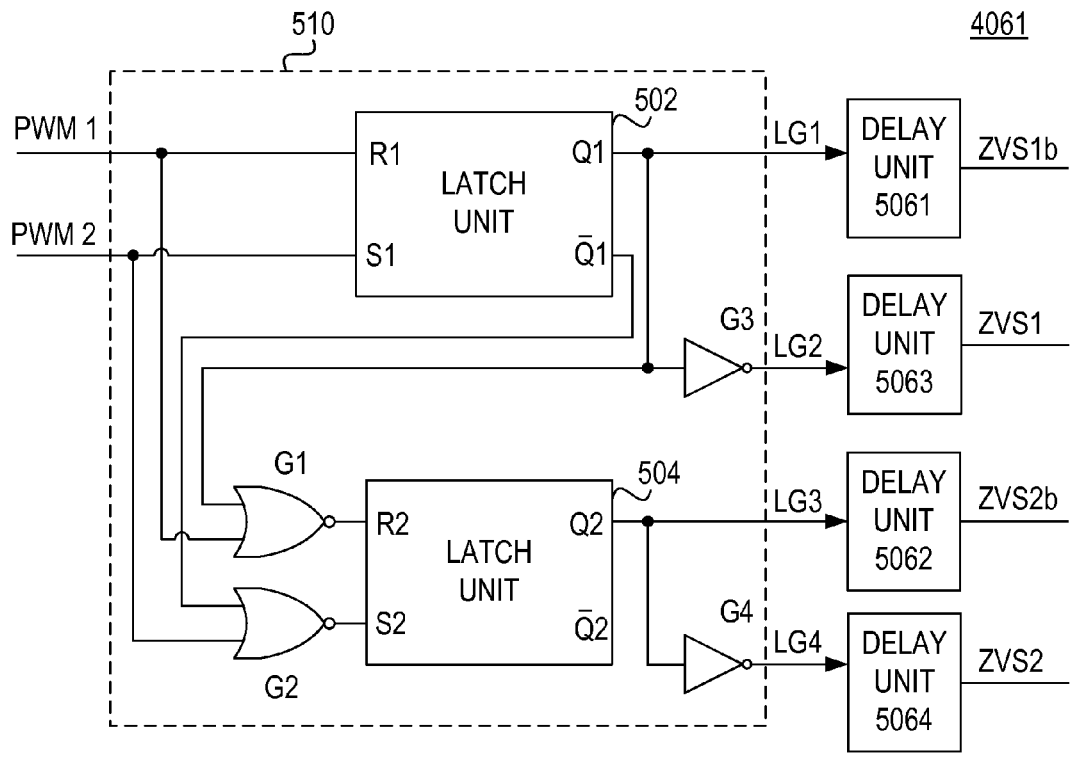
FIG. 5A illustrates a circuit diagram of an example of a first logic unit, in an embodiment according to the present invention.

FIG. 5A illustrates a circuit diagram of an example of the first logic unit 4061 in FIG. 4, in an embodiment according to the present invention. FIG. 5A is described in combination with FIG. 2, FIG. 3 and FIG. 4, and also in combination with FIG. 7 that illustrates examples of waveforms of the signals PWM1, PWM2, ZVS1, ZVS2, ZVS1b, and ZVS2b, and the currents $I_P$ and $I_S$, in an embodiment according to the present invention.

Referring to FIG. 5A, the first logic unit 4061 includes logic circuitry 510 and a set of delay units 5061, 5062, 5063, and 5064. The logic circuitry 510 includes NOR gates G1 and G2, NOT gates G3 and G4, and latches (or flip-flops) 502 and 504 such as set-reset (SR) latches. The signals PWM1 and PWM2 are provided to the latch 502, and are also provided to the latch 504 via the NOR gates G1 and G2. Latches or flip-flops are well known in the art and thus a detailed description of them and their functionality is omitted here for simplicity. The logic outputs of the latches 502 and 504 are provided to the delay units 5061 and 5062, and are also provided to the delay units 5063 and 5064 via the NOT gates G3 and G4.

In one embodiment, each of the delay units 5061-5064 includes a Break-before-Make (hereinafter referred to as BBM) switching element, and is used to delay signal pulses on rising edges only. More specifically, each of the delay units 5061-5064 can detect a corresponding logic output LG1, LG2, LG3, or LG4 from the logic circuitry 510 and generate a corresponding driving signal ZVS1b, ZVS1, ZVS2b, or ZVS2 according to a result of the detection. Each logic output LG1-LG4 has a first level (e.g., logic high) and a second level (e.g., logic low). If a delay unit 5061-5064 detects that a corresponding logic output LG1-LG4 is at the first level (e.g., logic high), the delay unit sets a corresponding driving signal ZVS1b, ZVS1, ZVS2b, or ZVS2 to an above mentioned turn-on status (e.g., logic high) after a predetermined delay. If the delay unit detects that the corresponding logic output is at the second level (e.g., logic low), the delay unit sets the corresponding driving signal to an above mentioned turn-off status (e.g., logic low). For example, if the delay unit 5061 detects a rising edge at its input terminal, e.g., the non-inverting output terminal of the latch 502, at time K, then the delay unit 5061 sets the driving signal ZVS1b to be logic high at time L after a predetermined delay. The time difference (L−K) can be defined as a BBM delay $D_{BBM}$. If the delay unit 5061 detects a falling edge at its input terminal at time K, the delay unit 5061 can set the driving signal ZVS1b to be logic low at time K without performing the time delay function. The delay units 5062, 5063, and 5064 can set the driving signals ZVS2b, ZVS1, and ZVS2 in a similar manner, respectively. As used herein, "a rising edge" means a signal turning from logic low to logic high, and "a falling edge" means a signal turning from logic high to logic low.

As shown in FIG. 5A, due to the NOT gate G3 coupled between the input terminals of the delay units 5061 and 5063, the input signals of the delay units 5061 and 5063 are reversed relative to each other. In one embodiment, a logic-high level is reversed to a logic-low level, and vice versa. Consequently, in the example of FIG. 5A, the rising edge of the driving signal ZVS1 always happens after a first period of time from the previous falling edge of the driving signal ZVS1b, and the rising edge of the driving signal ZVS1b always happens after a second period of time from the previous falling edge of the driving signal ZVS1, where the first period of time can be defined as a BBM delay of the delay unit 5063, and the second period of time can be defined as a BBM delay of the delay unit 5061. In a similar manner, the rising edge of the driving signal ZVS2 always happens after a third period of time from the previous falling edge of the driving signal ZVS2b, and the rising edge of the driving signal ZVS2b always happens after a fourth period of time from the previous falling edge of the driving signal ZVS2, where the third period of time can be defined as a BBM delay of the delay unit 5064, and the fourth period of time can be defined as a BBM delay of the delay unit 5062. The delay units 5061-5064 can have, but not necessarily, the same BBM delay, e.g., $D_{BBM}$. Thus, as shown in FIG. 3, if one of the switches Q1 and Q3 is turned off, then the other one can be turned on only after a preset delay, e.g., the BBM delay $D_{BBM}$, and also, if one of the switches Q2 and Q4 is turned off, then the other one can be turned on only after a preset delay, e.g., the BBM delay $D_{BBM}$.

Figure 1:
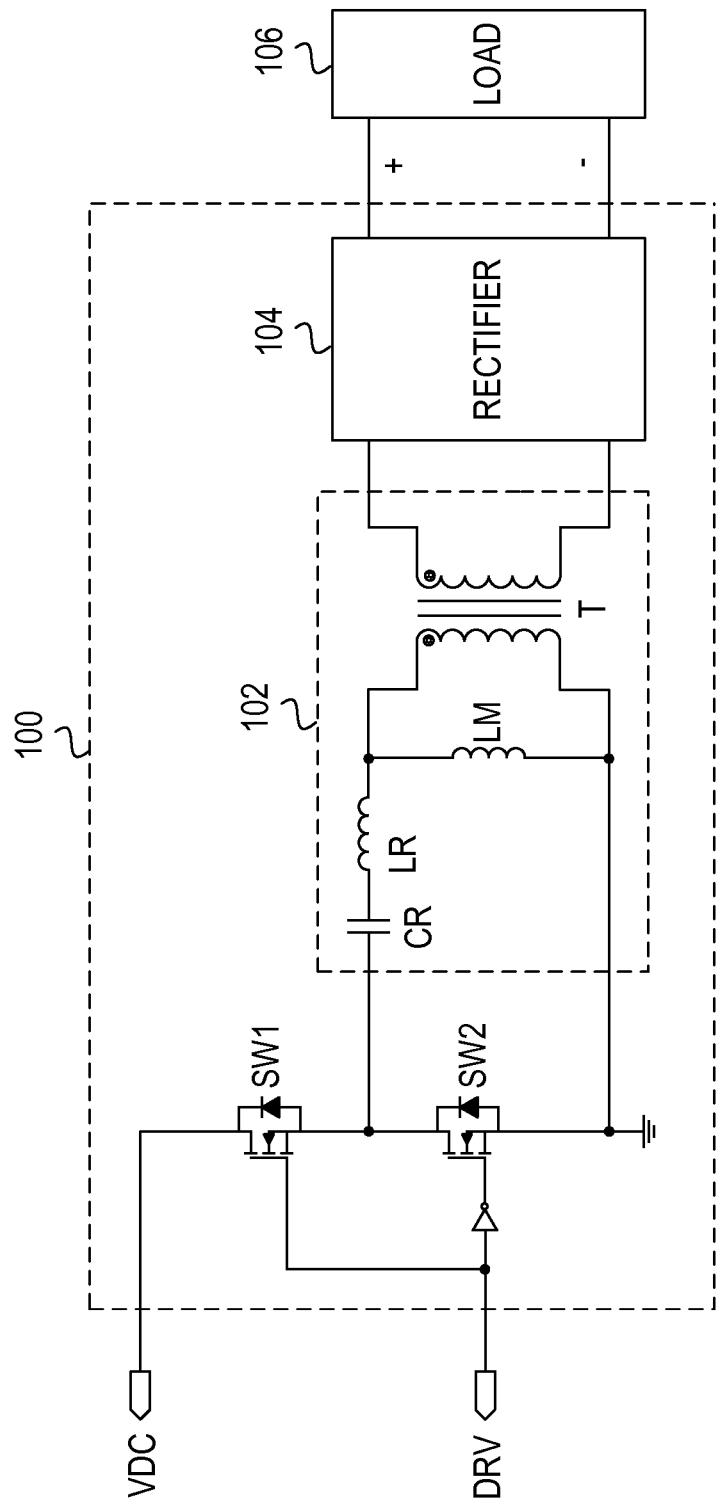
FIG. 1 shows a block diagram of a conventional power converter.

In one embodiment, a turn-off delay may exist between the time when a driving signal (e.g., ZVS1, ZVS1b, ZVS1, or ZVS2$b$) is generated for turning off a switch (e.g., Q1, Q2, Q3, or Q4) and the time when the switch is fully turned off, which is caused by non-ideality of the switch and/or associated circuitry such as a driver (not shown) that drives the switch. The BBM delay $D_{BBM}$ can be preset to be greater than the turn-off delay, so as to avoid cross conduction in the full-bridge switching circuit 310 in FIG. 3 (e.g., to avoid the switches Q1 and Q3 being on at the same time and to avoid the switches Q2 and Q4 being on at the same time), and thus to provide a zero-voltage-switching (ZVS) condition for the switching circuit 310. ZVS technologies are well known in the art and thus a detailed description of them and their functionality is omitted here for simplicity. Advantageously, damage to the conversion circuitry 300 and the switches Q1-Q4, similar to that mentioned in relation to the conventional DC/DC converter 100 in FIG. 1, can be avoided. Also, switching losses of the switches Q1-Q4 can be reduced in the switching circuit 310 under the ZVS condition.

In one embodiment, the pulses of the signals PWM1 and PWM2 are generated alternately and are non-overlapping, e.g., the signal PWM1 is logic low when the signal PWM2 is logic high, and the signal PWM2 is logic low when the signal PWM1 is logic high. In the example of FIG. 5A, the logic circuitry 510 can set the output LG1 to logic low and the output LG2 to logic high on detection of a rising edge of the signal PWM1, set the output LG3 to logic low and the output LG4 to logic high on detection of a falling edge of the signal PWM1, set the output LG1 to logic high and the output LG2 to logic low on detection of a rising edge of the signal PWM2, and set the output LG3 to logic high and the output LG4 to logic low on detection of a falling edge of the signal PWM2.

Figure 7:
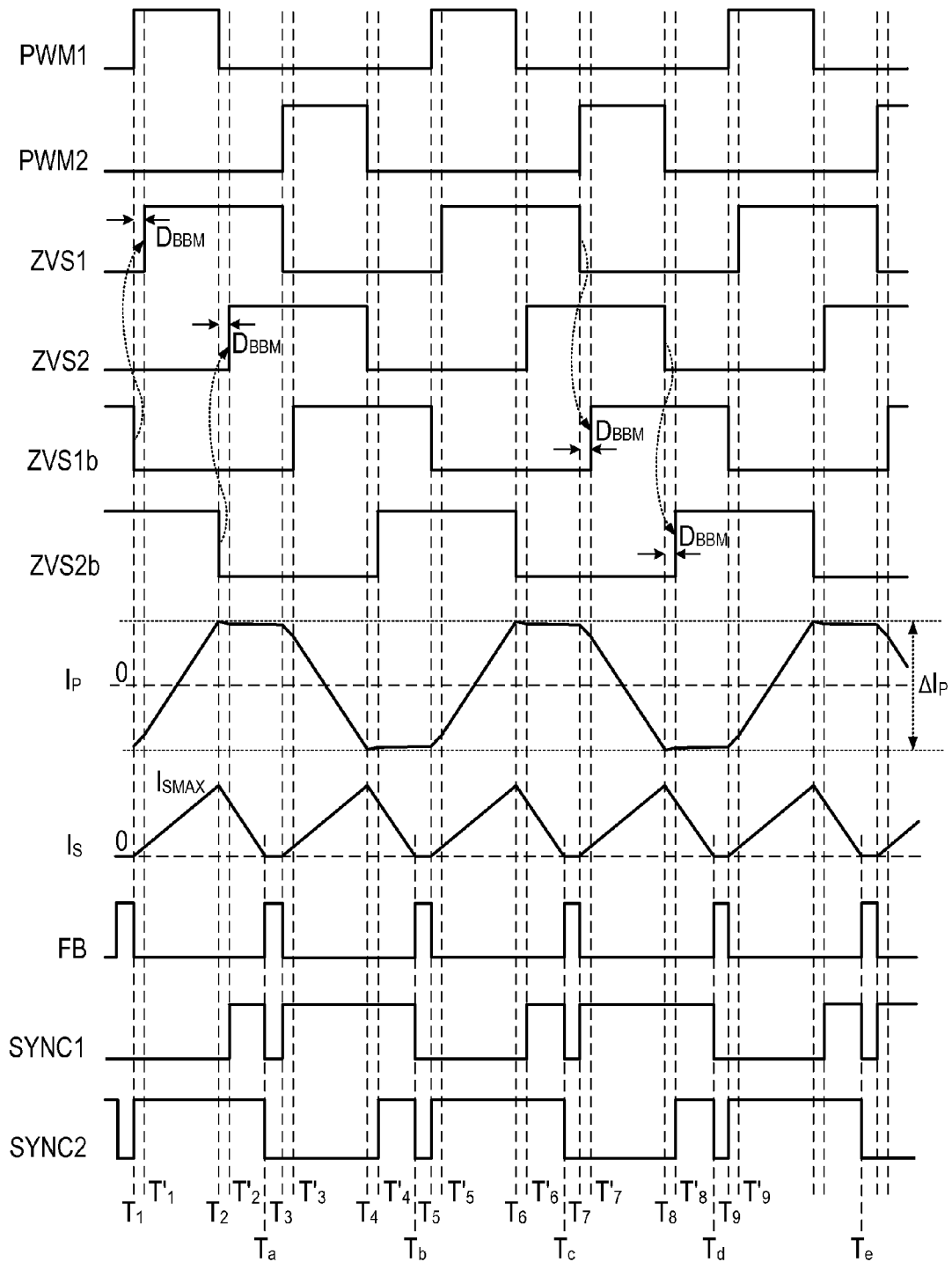
FIG. 7 illustrates examples of waveforms of PWM signals, driving signals, control signals, a primary current, a secondary current, and a feedback signal, in an embodiment according to the present invention.

Thus, as shown in FIG. 7, when the first logic unit 4061 detects a rising edge of the signal PWM1 (e.g., at time $T_1$ shown in FIG. 7), the delay unit 5061 sets the driving signal ZVS1$b$ to be logic low (e.g., at time $T_1$), and the delay unit 5063 sets the driving signal ZVS1 to be logic high (e.g., at time $T'_1$) with a BBM delay, e.g., $D_{BBM}$. When the first logic unit 4061 detects a falling edge of the signal PWM1 (e.g., at time $T_2$), the delay unit 5062 sets the driving signal ZVS2$b$ to be logic low (e.g., at time $T_2$), and the delay unit 5064 sets the driving signal ZVS2 to be logic high (e.g., at time $T'_2$) with a BBM delay, e.g., $D_{BBM}$. Similarly, on detecting a pulse of the signal PWM2 (e.g., at time $T_3$), the delay unit 5063 sets the driving signal ZVS1 to be logic low (e.g., at time $T_3$), and the delay unit 5061 sets the driving signal ZVS1$b$ to be logic high (e.g., at time $T'_3$) with a BBM delay, e.g., $D_{BBM}$. When the signal PWM2 turns to logic low (e.g., at time $T_4$), the delay unit 5064 sets the driving signal ZVS2 to be logic low (e.g., at time $T_4$), and the delay unit 5062 sets the driving signal ZVS2$b$ to be logic high (e.g., at time $T'_4$) with a BBM delay, e.g., $D_{BBM}$.

Accordingly, during time $T_1$ to $T'_1$, the switch Q4 is on, the switches Q1, Q2 and Q3 are off, and the body diode of the switch Q1 is forward biased; and during time $T_1$ to $T_2$, the switches Q1 and Q4 are on and the switches Q2 and Q3 are off. Thus, during time $T_1$ to $T_2$, the power conversion circuit 312 operates in an aforementioned power receive mode. Similarly, during time $T_3$ to $T_4$, $T_5$ to $T_6$, etc., the power conversion circuit 312 operates in the power receive mode. In the power receive mode, as shown in FIG. 7, the primary current $I_P$ ramps up or down, and the secondary current $I_S$ increases. During time $T_2$ to $T'_2$, the switch Q1 is on, the switches Q2-Q4 are off, and the body diode of the switch Q2 is forward biased; and during time $T'_2$ to $T_3$, the switches Q1 and Q2 are on and the switches Q3 and Q4 are off. Thus, during time $T_2$ to $T_3$, the power conversion circuit 312 operates in an aforementioned power conserve mode. Similarly, during time $T_4$ to $T_5$, $T_6$ to $T_7$, etc., the power conversion circuit 312 operates in the power conserve mode. In the power conserve mode, the primary current $I_P$ remains approximately constant and the secondary current $I_S$ decreases.

As a result, as shown in FIG. 7, the power conversion circuit 312 can alternate between the power receive mode and the power conserve mode. The power conversion circuit 312 can operate in the power receive mode when one of the signals PWM1 and PWM2 is logic high, and can operate in the power conserve mode when both of the signals PWM1 and PWM2 are logic low. The power receive period $T_{PR}$ during which the power conversion circuit 312 stays in the power receive mode can be substantially equal to a pulse width of the signal PWM1 or PWM2. Thus, the controller 202 in FIG. 2 or FIG. 4 can increase the pulse width of the signal PWM1 or PWM2 to prolong the power receive period $T_{PR}$, so as to increase the output voltage $V_{OUT}$ of the conversion circuitry 300. The controller 202 can also decrease the pulse width of the signal PWM1 or PWM2 to shorten the power receive period $T_{PR}$, so as to decrease the output voltage $V_{OUT}$.

In one embodiment, the power conversion circuit 312 can alternate between the power receive mode and the power conserve mode at an alternation frequency that is determined by a frequency of the signal PWM1 or PWM2. By way of example, the alternation frequency can be given by: $1/(T_3-T_1)$, $1/(T_5-T_3)$, $1/(T_7-T_5)$, or the like. A frequency of the signal PWM1 can be given by: $1/(T_5-T_1)$, and a frequency of the signal PWM2 can be given by: $1/(T_7-T_3)$. In one embodiment, the signals PWM1 and PWM2 derive from the same PWM signal, e.g., a PWM signal 520 shown in FIG. 5B, and therefore the time durations $T_3-T_1$, $T_5-T_3$, and $T_7-T_5$ can be the same. In one such embodiment, the alternation frequency can be two times the frequency of the signal PWM1 or PWM2. The controller 202 can increase the frequency of the signal PWM1 or PWM2 to increase the output voltage $V_{OUT}$, or decrease the frequency of the signal PWM1 or PWM2 to decrease the output voltage $V_{OUT}$. Consequently, the controller 202 can regulate the output voltage $V_{OUT}$ to a target level or a desired level by controlling the signals PWM1 and PWM2.

If the conversion circuitry 300 is used to power a light load, the controller 202 can set the frequencies of the signals PWM1 and PWM2 to be relatively low. Advantageously, compared with a conventional power converter which is driven by driving signals at a fixed frequency, embodiments of the conversion circuitry 300 can reduce the switching losses and improve the efficiency of the power conversion.

Additionally, in one embodiment, a ratio of the power receive period $T_{PR}$ to the sum of the power receive period $T_{PR}$ and the power conserve period $T_{PC}$, e.g., $T_{PR}/(T_{PR}+T_{PC})$, can be referred to as a "duty cycle of power conversion." In a steady state, the output voltage $V_{OUT}$ of the conversion circuitry 300 can be regulated at a relatively stable level determined by the duty cycle of power conversion. The relatively stable level can increase if the duty cycle of power conversion increases, and can decrease if the duty cycle of power conversion decreases. In one embodiment, the duty cycle of power conversion is determined by, e.g., equal to two times of, the duty cycle of the signal PWM1 or PWM2. Thus, the controller 202 can increase or decrease the duty cycle of the signal PWM1 or PWM2 to satisfy different requirements for the target level of the output voltage $V_{OUT}$. Advantageously, the duty cycle of power conversion can vary from a relatively small value, e.g., by increasing the time span between the pulses of the signals PWM1 and PWM2 such as the duration between time $T_2$ and $T_3$ shown in FIG. 7, to a relatively large value, e.g., by decreasing the time span between the pulses of the signals PWM1 and PWM2. Thus, the conversion circuitry 300 is capable of regulating the output voltage $V_{OUT}$ to a target level within a relatively wide range of voltage levels.

Moreover, in one embodiment, the signals PWM1 and PWM2 can have the same pulse width and the same frequency. Thus, the driving signals ZVS1, ZVS1b, ZVS2, and ZVS2b can have 50% duty cycles even if a load power of the conversion circuitry 300 changes. For example, the driving signals ZVS1, ZVS1b, ZVS2, and ZVS2b can have 50% duty cycles if the conversion circuitry 300 powers a load at a first power level. The driving signals ZVS1, ZVS1b, ZVS2, and ZVS2b can also have 50% duty cycles if the conversion circuitry 300 powers a load at a second power level different from the first power level. Thus, each of the switches Q1-Q4 can be turned on and off alternately with a 50% switching duty cycle whether the conversion circuitry 300 is powering a heavy load or a light load. Advantageously, even if the pulse width of the signals PWM1 and PWM2 is controlled to be very small or very large, the switches Q1-Q4 can be turned on or off properly due to the 50% switching duty cycle.

Figure 5B:
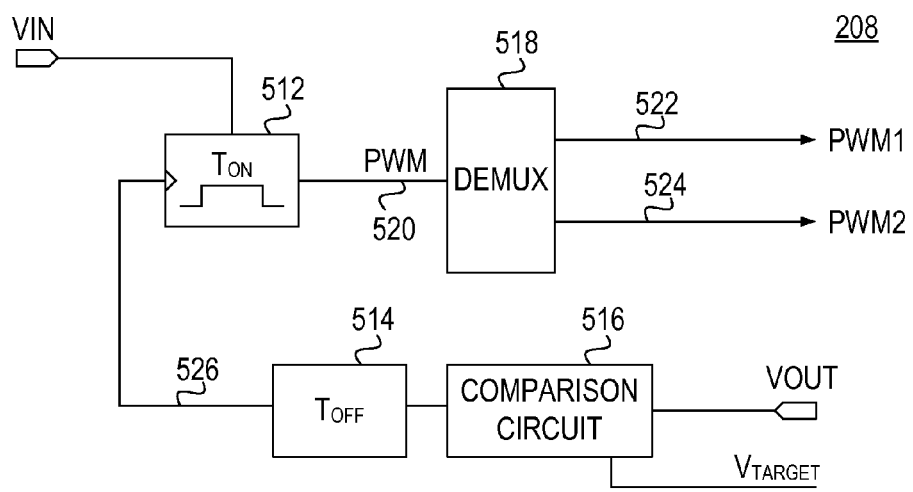
FIG. 5B illustrates a circuit diagram of an example of a signal generator, in an embodiment according to the present invention.

FIG. 5B illustrates a circuit diagram of an example of the signal generator 208 that generates the abovementioned signals PWM1 and PWM2, in an embodiment according to the present invention. FIG. 5B is described in combination with FIG. 2, FIG. 3, FIG. 4, FIG. 5A, and FIG. 7. In one embodiment, the signal generator 208 has structures similar to those of the control circuitry 340 disclosed in the commonly-owned U.S. Patent Application Publication No. 2013/0016530, hereby incorporated by reference in its entirety. As shown in FIG. 5B, the signal generator 208 includes a pulse-width control circuit 512, a frequency control circuit 514, a comparison circuit 516, and a multiplexer 518.

In one embodiment, the pulse-width control circuit 512 receives an input voltage $V_{IN}$ of the power conversion circuit 312 and controls a pulse width of a PWM signal 520 to be inversely proportional to the input voltage $V_{IN}$. By way of example, the pulse-width control circuit 512 can include a timer that starts to count time in response to a trigger signal 526. The pulse-width control circuit 512 further sets the PWM signal 520 to be logic high in response to the trigger signal 526 and to be logic low when a time interval $T_{ON}$, inversely proportional to the input voltage $V_{IN}$, expires. The time interval $T_{ON}$ can be given by: $T_{ON}=K/V'_{IN}$, where $V_{IN}$ represents a voltage across the primary winding of the transformer circuit 320 that is determined by the input voltage $V_{IN}$, and the coefficient K represents a preset constant. Additionally, the comparison circuit 516 can compare the output voltage $V_{OUT}$ at the output terminal VOUT with a target voltage level $V_{TARGET}$, and generate a comparison result to the frequency control circuit 514. According to the comparison result, the frequency control circuit 514 can control a frequency of the trigger signal 526, so as to increase the frequency of the PWM signal 520 if the output voltage $V_{OUT}$ is less than target voltage level $V_{TARGET}$, and to decrease the frequency of the PWM signal 520 if the output voltage $V_{OUT}$ is greater than target voltage level $V_{TARGET}$. By way of example, the comparison circuit 516 can include an error amplifier or a differential amplifier to perform the comparison. The frequency control circuit 514 can be, but not necessarily, a timer that controls the time interval during which the PWM signal 520 is logic low. The frequency control circuit 514 can also be, but not necessarily, a controllable oscillator such as a voltage-controlled oscillator. The multiplexer 518 can transfer the pulses of the PWM signal 520 to channels 522 and 524 to generate the above mentioned signals PWM1 and PWM2, alternately.

As a result, the controller 202 can use the signal generator 208 to control the power receive period $T_{PR}$ (e.g., the duration between time $T_1$ and $T_2$, between time $T_3$ and $T_4$, etc.) to be inversely proportional to the input voltage $V_{IN}$. Thus, advantageously, as shown in FIG. 7, the primary current $I_P$ can have a substantially constant ripple magnitude $\Delta I_P$, which can stabilize the power conversion process. Also, the signal generator 208 can set the ratio between the pulse width $T_{ON}$ of the PWM signal 520 and the input voltage $V_{IN}$ to a predetermined value such that the ripple magnitude $\Delta I_P$ is within a saturation limit, so as to avoid flux saturation in the core of the transformer circuit 320.

Moreover, the controller 202 can use the signal generator 208 to vary the frequency of the signals PWM1 and PWM2 according to the output voltage $V_{OUT}$, which brings the aforementioned benefits to the conversion circuitry 300, e.g., reducing switching losses, improving the efficiency of the power conversion, regulating the output voltage $V_{OUT}$ to a target level within a relatively wide range of voltage levels, etc. Detailed explanations regarding the constant ripple magnitude $\Delta I_P$ and the variation of the frequency of the signals PWM1 and PWM2 can be found in the commonly-owned U.S. Patent Application Publication No. 2013/0016530.

Furthermore, as mentioned above, the frequency control circuit 514 is a controllable oscillator in one embodiment. The oscillator can generate the trigger signal 526 at a frequency controlled based on the output voltage $V_{OUT}$. The pulse-width control circuit 512 can control the pulse width of the PWM signal 520 based on the input voltage $V_{IN}$, which is independent from the output voltage $V_{OUT}$. In one embodiment, the oscillator can set a maximum frequency for the trigger signal 526, and limit the frequency of the trigger signal 526 within the maximum frequency. The maximum frequency is less than the value of $1/T_{ON}$, where $T_{ON}$ represents the time interval during which the PWM signal 520 is logic high. In another embodiment, the oscillator can detect whether the PWM signal 520 is logic high or logic low. If the conversion circuitry 300 is powering a heavy load, the oscillator can halt the generating of the trigger signal 526 when the PWM signal 520 is logic high, and can generate the trigger signal 526 on detection of a falling edge of the PWM signal 520. Thus, advantageously, the situation of generating the trigger signal 526 when the PWM signal 520 is logic high can be avoided.

Figure 5C:
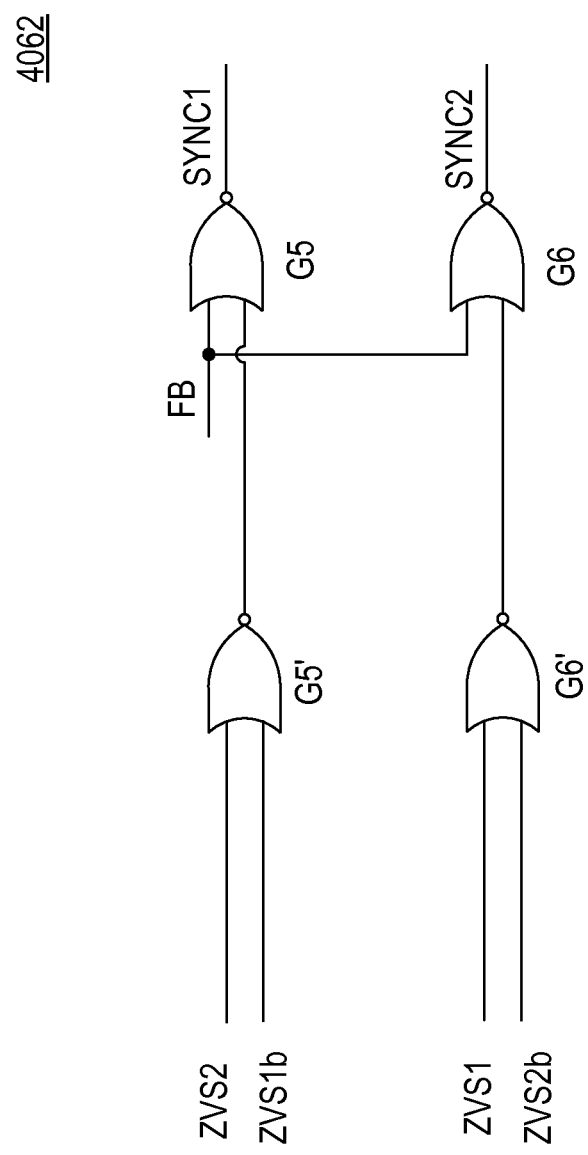
FIG. 5C illustrates a circuit diagram of an example of a second logic unit, in an embodiment according to the present invention.

FIG. 5C illustrates a circuit diagram of an example of the second logic unit 4062 in FIG. 4, in an embodiment according to the present invention. As shown in FIG. 5C, the second logic unit 4062 includes NOR gates G5, G5', G6, and G6'. The driving signals ZVS2 and ZVS1b are provided to the NOR gate G5'. A feedback signal, e.g., the feedback signal FB generated in FIG. 3, and the output of the NOR gate G5' are provided to the NOR gate G5 to generate the control signal SYNC1 controlling the rectifying switch 51 of the rectifying circuit 314 in FIG. 3. Similarly, the driving signals ZVS1 and ZVS2b are provided to the NOR gate G6'. The feedback signal FB and the output of the NOR gate G6' are provided to the NOR gate G6 to generate the control signal SYNC2 controlling the rectifying switch S2 of the rectifying circuit 314 in FIG. 3. As described in relation to FIG. 3, if the current $I_S$ flowing through the sensing resistor RSEN decreases to zero amperes (e.g., at time $T_a$, $T_b$, etc., shown in FIG. 7), the feedback circuit 316 can provide the feedback signal FB (with a pulse at logic high) to the second logic unit 4062. By receiving the feedback signal FB, the NOR gates G5 and G6 in FIG. 5B can control the driving signals SYNC1 and SYNC2 to be logic low, respectively. Advantageously, the rectifying switches S1 and S2 in FIG. 3 are turned off, preventing the reverse current flowing in the secondary winding of the transformer circuit 320, and thus, the conversion circuitry 300 can be protected from malfunction.

Figure 6:
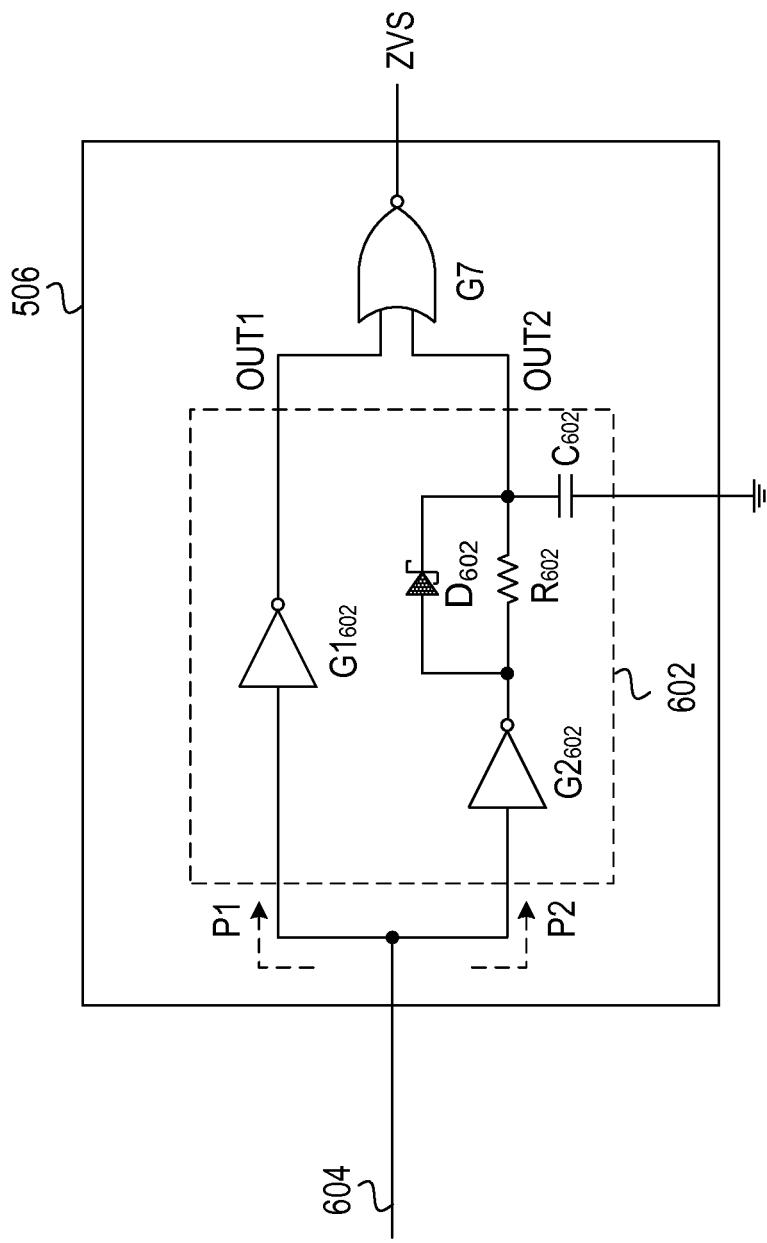
FIG. 6 illustrates a circuit diagram of an example of a delay unit, in an embodiment according to the present invention.

FIG. 6 illustrates a circuit diagram of an example of a delay unit 506, in an embodiment according to the present invention. FIG. 6 is described in combination with FIG. 5A, and elements that are labeled the same as in FIG. 5A have similar functions. The delay unit 506 is one embodiment of the delay units 5061-5064 in FIG. 5A, and is not intended to limit this invention. One skilled in the art would understand that the delay units 5061-5064 can be constituted differently in other embodiments.

In the FIG. 6 embodiment, the delay unit 506 includes a BBM unit 602 and a NOR gate G7. The BBM unit 602 includes paths P1 and P2. The path P1 includes a NOT gate $G1_{602}$, and the path P2 includes a NOT gate $G2_{602}$, a resistor $R_{602}$, a diode $D_{602}$, and a capacitor $C_{602}$. In one embodiment, when the delay unit 506 detects a falling edge at its input terminal 604 from, e.g., the latch 502, the latch 504, the NOT gate G3, or the NOT gate G4 in FIG. 5A, the NOT gate $G1_{602}$ can immediately output a logic-high signal to the NOR gate G7, and therefore the NOR gate G7 can immediately output a driving signal ZVS at logic low; and meanwhile, the NOT gate $G2_{602}$ can output a logic-high signal to charge the capacitor $C_{602}$ through the resistor $R_{602}$ and the diode $D_{602}$ so that the capacitor $C_{602}$ is charged to have a logic-high level. When the delay unit 506 detects a rising edge at its input terminal 604, the NOT gate $G1_{602}$ can output a logic-low signal to the NOR gate G7, and meanwhile the NOT gate $G2_{602}$ can also output a logic-low signal to discharge the capacitor $C_{602}$ through the resistor $R_{602}$ so that the voltage of the capacitor $C_{602}$ starts to decrease from the logic-high level. Thus, on detecting a rising edge of an input signal, the delay unit 506 can maintain the driving signal ZVS to be logic low until the voltage of the capacitor $C_{602}$ decreases to a logic-low level.

As a result, when the delay unit 506 receives a logic-low signal, the delay unit 506 can set the driving signal ZVS to be logic low without delay; and when the delay unit 506 receives a logic-high signal, the delay unit 506 can set the driving signal ZVS to be logic high after a BBM delay, e.g., $D_{BBM}$. In one such embodiment, the BBM delay $D_{BBM}$ includes a time duration for the voltage of the capacitor $C_{602}$ to decrease from a logic-high level to a logic-low level.

FIG. 7 illustrates examples of waveforms of the signals PWM1, PWM2, ZVS1, ZVS2, ZVS1b, ZVS2b, SYNC1, SYNC2, and FB, and the currents $I_P$ and $I_S$, in an embodiment according to the present invention. An operational process of the DC/DC converter 200 in FIG. 2 is illustrated based on FIG. 7, in combination with FIG. 2, FIG. 3, FIG. 4, FIG. 5A, FIG. 5B, FIG. 5C, and FIG. 6.

In operation, as shown in FIG. 7, the signal generator 208 (in FIG. 2, FIG. 4, or FIG. 5C) generates pulses of the signals PWM1 and PWM2 alternately. When the signal PWM1 is logic high, the first logic unit 4061 (in FIG. 4 or FIG. 5A) can control the driving signals ZVS1 and ZVS2b to be logic high to turn on the switches Q1 and Q4; and when the signal PWM2 is logic high, the first logic unit 4061 can control the driving signals ZVS2 and ZVS1b to be logic high to turn on the switches Q2 and Q3. Hence, when the signal PWM1 or PWM2 is logic high, the power conversion circuit 312 in FIG. 3 operates in the above mentioned power receive mode. When both of the signals PWM1 and PWM2 are logic low, either the driving signals ZVS1 and ZVS2 are logic high to turn on the switches Q1 and Q2, or the driving signals ZVS1b and ZVS2b are logic high to turn on the switches Q2 and Q4. Hence, when both the signals PWM1 and PWM2 are logic low, the power conversion circuit 312 operates in the above mentioned power conserve mode. As a result, the power conversion circuit 312 can alternate between the power receive mode and the power conserve mode.

Whenever the power conversion circuit 312 is in an interim transition from the power receive mode to the power conserve mode or from the power conserve mode to the power receive mode (e.g., at time $T_1$, $T_2$, $T_3$, $T_4$, etc.), the first logic unit 4061 (in FIG. 4 or FIG. 5A) can prevent the driving signals ZVS1 and ZVS1b from being logic high at the same time so as to prevent the switches Q1 and Q3 (in FIG. 3) from being turned on at the same time, and can prevent the driving signals ZVS2 and ZVS2b from being logic high at the same time so as to prevent the switches Q2 and Q4 (in FIG. 3) from being turned on at the same time. By way of example, the first logic unit 4061 can turn on one of the switches Q1 and Q3 after a predetermined delay $D_{BBM}$ after turning off the other one of the switches Q1 and Q3, and can turn on one of the switches Q2 and Q4 after the predetermined delay $D_{BBM}$ after turning off the other one of the switches Q2 and Q4. As such, advantageously, the first logic unit 4061 provides a zero-voltage-switching condition for the switches Q1-Q4.

As shown in FIG. 7, during the power receive mode, e.g., when the signal PWM1 or PWM2 is logic high, the primary current $I_P$ of the transformer circuit 320 ramps up or down centered at, e.g., zero amperes, and the secondary current $I_S$ of the transformer circuit 320 that represents output power of the power conversion circuit 312 increases. During the power conserve mode, e.g., when both the signals PWM1 and PWM2 are logic low, the primary current $I_P$ remains approximately constant, and the secondary current $I_S$ deceases. As such, the signal generator 208 can increase or decrease the duty cycles of the signals PWM1 and PWM2 to control the output power. Advantageously, as discussed in relation to FIG. 5B, the signal generator 208 can control the power receive period $T_{PR}$ to be inversely proportional to the input voltage $V_{IN}$ of the transformer circuit 320, so as to control a ripple magnitude $\Delta I_P$ of the primary current $I_P$ to be substantially constant and to stabilize the power conversion process of the power conversion circuit 312. The signal generator 208 can also set the ripple magnitude $\Delta I_P$ to be within a saturation limit, so as to avoid flux saturation in the core of the transformer circuit 320. Moreover, the signal generator 208 can vary the frequency of the signals PWM1 and PWM2 according to the output voltage $V_{OUT}$ of the power conversion circuit 312, so as to, as described above, reduce switching losses, improve the efficiency of the power conversion, and regulate the output voltage $V_{OUT}$ to a target level within a relatively wide range.

Furthermore, as shown in FIG. 7, during each power conserve mode, if the secondary current $I_S$ decreases to zero amperes (e.g., at $T_a$, $T_b$, etc.), the feedback circuit 316 in FIG. 3 can generate a corresponding feedback signal FB to the second logic unit 4062 (in FIG. 4 or FIG. 5B). Hence, the second logic unit 4062 can set the control signals SYNC1 and SYNC2 to be logic low to turn off the switches S1 and S2. As such, advantageously, the second logic unit 4062, in combination with the feedback circuit 316, can prevent a reverse flow of the secondary current $I_S$ (e.g., from the load 308 to ground through the inductor L2, the secondary winding, and the sensing resistor $R_{SEN}$, in FIG. 3), so as to protect the conversion circuitry 300.

Figure 8:
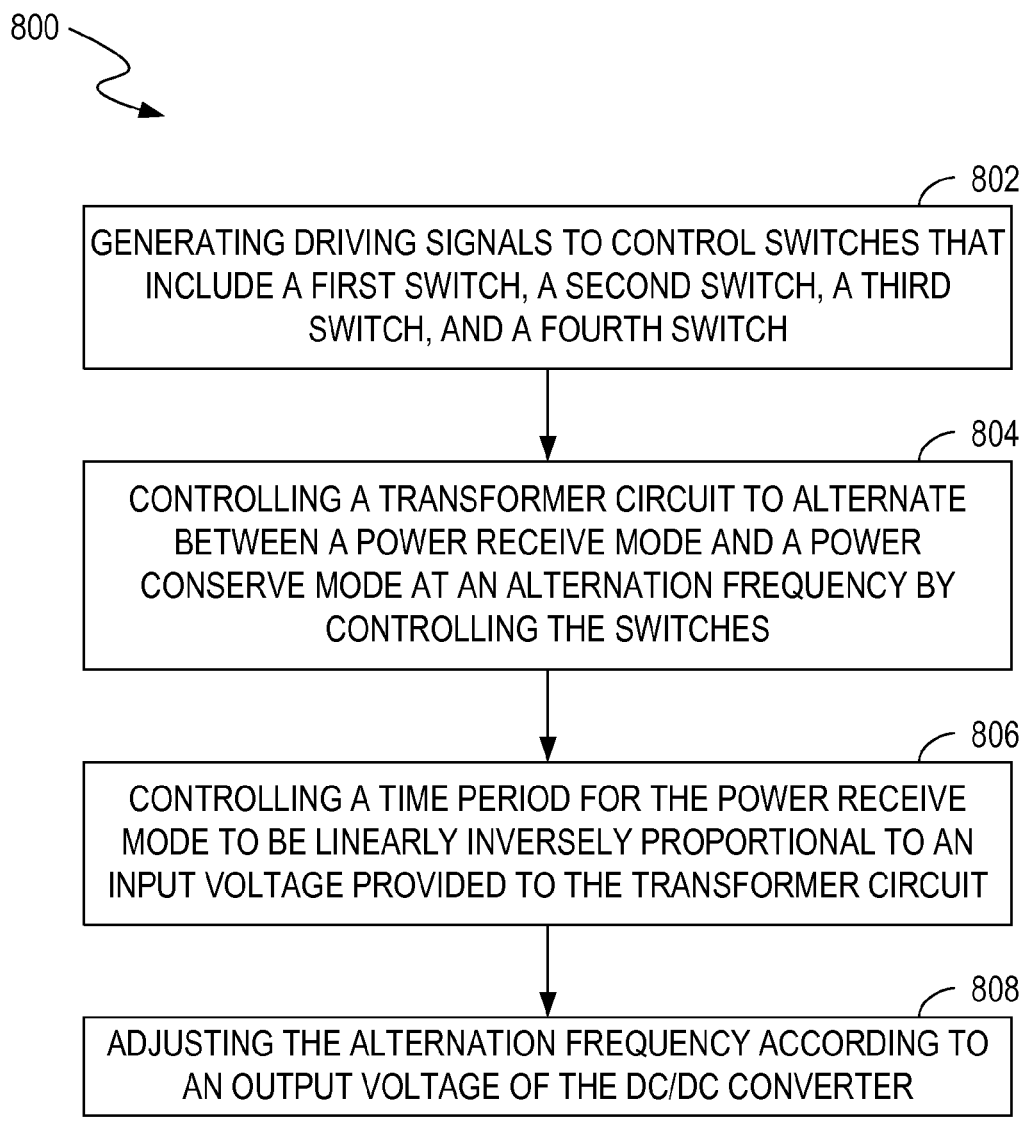
FIG. 8 illustrates a flowchart of a method for controlling a DC/DC converter, in an embodiment according to the present invention.

FIG. 8 illustrates a flowchart 800 of a method for controlling a DC/DC converter 200, in an embodiment according to the present invention. FIG. 8 is described in combination with FIG. 2, FIG. 3, FIG. 4, FIG. 5A, FIG. 5B, FIG. 5C, FIG. 6, and FIG. 7.

At step 802, the control circuitry 206 (in FIG. 2 or FIG. 4) generates driving signals ZVS1, ZVS1b, ZVS2, and ZVS2b to control switches that include a first switch (e.g., Q1), a second switch (e.g., Q2), a third switch (e.g., Q3), and a fourth switch (e.g., Q4). The first switch Q1 is coupled to the third switch Q3 via a first connection node N1, and the second switch Q2 is coupled to the fourth switch Q4 via a second connection node N2.

At step 804, the control circuitry 206 controls the transformer circuit 320 to alternate between a power receive mode and a power conserve mode at an alternation frequency by controlling the switches Q1-Q4. The transformer circuit is coupled between the first connection node N1 and the second connection node N2.

At step 806, the signal generator 208 (in FIG. 2, FIG. 4, or FIG. 5B), e.g., including an above mentioned timer in a pulse-width control circuit 512, controls a power receive period $T_{PR}$ for the power receive mode to be inversely proportional to an input voltage $V_{IN}$ provided to the transformer circuit 320.

At step 808, the signal generator 208, e.g., including an abovementioned frequency control circuit 514, adjusts the alternation frequency according to output power such as an output voltage $V_{OUT}$ of the DC/DC converter 200.

As a result, the DC/DC converter 200 can have reduced switching losses, an improved efficiency of power conversion, and can regulate the output voltage $V_{OUT}$ to a target level within a relatively wide range. The DC/DC converter 200 can also control a primary current $I_P$ of the transformer circuit 320 to have a substantially constant ripple magnitude, so as to stabilize the power conversion process and avoid flux saturation in the core of the transformer circuit 320.

Figure 9:
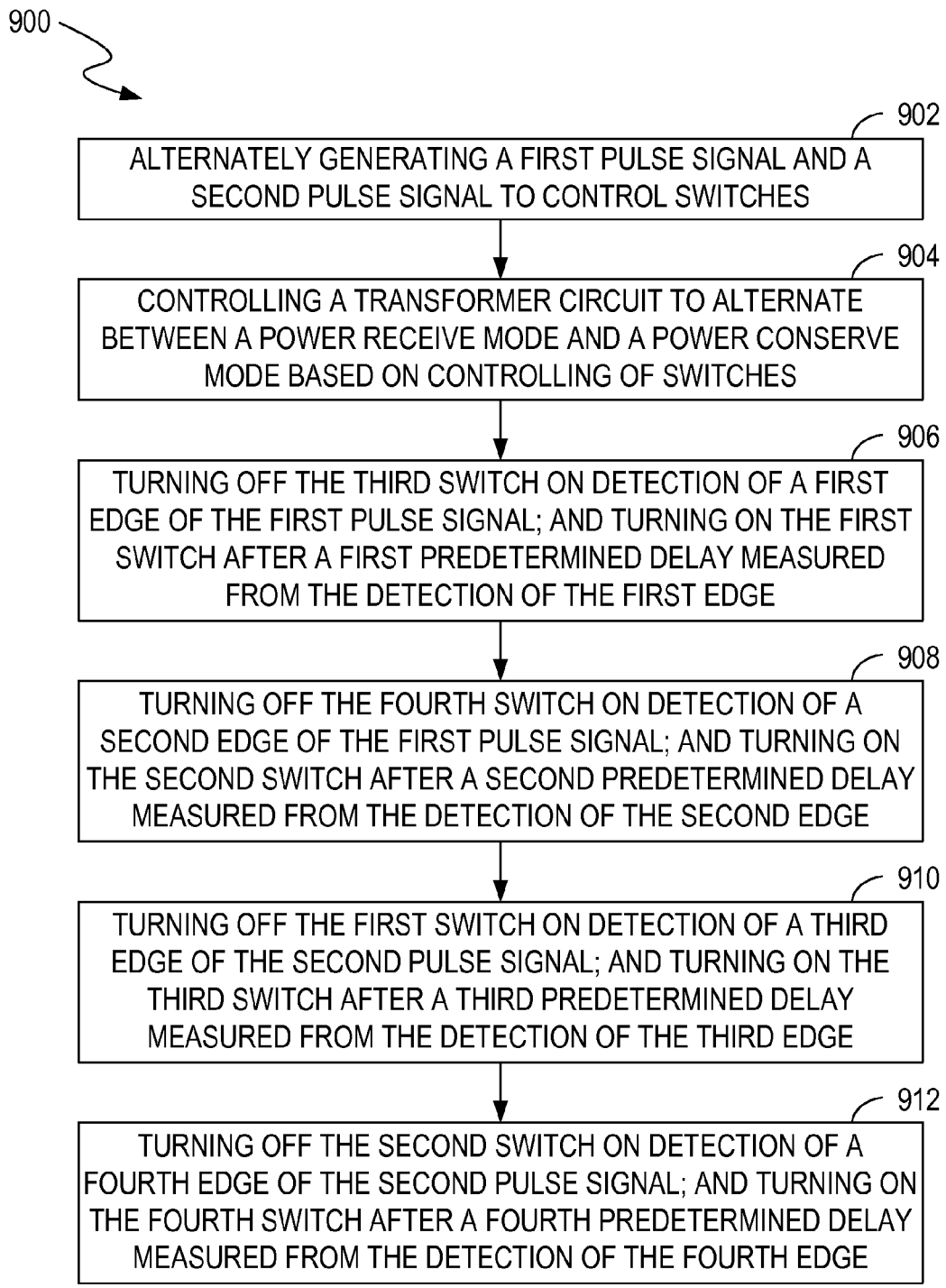
FIG. 9 illustrates a flowchart of a method for controlling a DC/DC converter, in an embodiment according to the present invention.

FIG. 9 illustrates a flowchart 900 of a method for controlling a DC/DC converter 200, in an embodiment according to the present invention. FIG. 9 is described in combination with FIG. 2, FIG. 3, FIG. 4, FIG. 5A, FIG. 5B, FIG. 5C, FIG. 6, and FIG. 7.

At step 902, the signal generator 208 (in FIG. 2, FIG. 4, or FIG. 5B) alternately generates a first pulse signal, e.g., a pulse of the signal PWM1, and a second pulse signal, e.g., a pulse of the signal PWM2, to control switches including a first switch (e.g., Q1), a second switch (e.g., Q2), a third switch (e.g., Q3), and a fourth switch (e.g., Q4).

At step 904, the first logic unit 4061 (in FIG. 4 or FIG. 5A) cooperates with the signal generator 208 to control the transformer circuit 320 to alternate between a power receive mode and a power conserve mode based on the controlling of the switches Q1-Q4.

At step 906, the first logic unit 4061 turns off the third switch (e.g., Q3) on detection of a first edge of the first pulse signal, e.g., a rising edge of the signal PWM1, and turns on the first switch (e.g., Q1) after a first predetermined delay $D_{BBM1}$ measured from the detection of the first edge.

At step 908, the first logic unit 4061 turns off the fourth switch (e.g., Q4) on detection of a second edge of the first pulse signal, e.g., a falling edge of the signal PWM1, and turns on the second switch (e.g., Q2) after a second predetermined delay $D_{BBM2}$ measured from the detection of the second edge.

At step 910, the first logic unit 4061 turns off the first switch (Q1) on detection of a third edge of the second pulse signal, e.g., a rising edge of the signal PWM2, and turns on the third switch (e.g., Q3) after a third predetermined delay $D_{BBM3}$ measured from the detection of the third edge.

At step 912, the first logic unit 4061 turns off the second switch (e.g., Q2) on detection of a fourth edge of the second pulse signal, e.g., a falling edge of the signal PWM2, and turns on the fourth switch (e.g., Q4) after a fourth predetermined delay $D_{BBM4}$ measured from the detection of the fourth edge. In one embodiment, the first, second, third, and fourth predetermined delays can be, but not necessarily, the same.

In one embodiment, the first switch is the switch Q1, the second switch is the switch Q2, the third switch is the switch Q3, and the fourth switch is the switch Q4, and the driving signals ZVS1, ZVS1b, ZVS2, and ZVS2b generated by the first logic unit 4061 control the switches Q1, Q3, Q2, and Q4, respectively. Accordingly, by performing the step 906 to the step 912, statuses of the switches Q1-Q4 can be controlled in the following sequence (a1)-(h1) repeatedly:

(a1) the switch Q3 is turned off;
(b1) the switch Q1 is turned on;
(c1) the switch Q4 is turned off;
(d1) the switch Q2 is turned on;
(e1) the switch Q1 is turned off;
(f1) the switch Q3 is turned on;
(g1) the switch Q2 is off; and
(h1) the switch Q4 is turned on.

However, the invention is not so limited. In another embodiment, the first switch is the switch Q4, the second switch is the switch Q3, the third switch is the switch Q2, and the fourth switch is the switch Q1, and the driving signals ZVS1, ZVS1b, ZVS2, and ZVS2b generated by the first logic unit 4061 control the switches Q4, Q2, Q3, and Q1, respectively. Accordingly, by performing the step 906 to the step 912, statuses of the switches Q1-Q4 can be controlled in the following sequence (a2)-(h2) repeatedly:

(a2) the switch Q2 is turned off;
(b2) the switch Q4 is turned on;
(c2) the switch Q1 is turned off;
(d2) the switch Q3 is turned on;
(e2) the switch Q4 is turned off;
(f2) the switch Q2 is turned on;
(g2) the switch Q3 is off; and
(h2) the switch Q1 is turned on.

As a result, the power conversion circuit 312 can alternate between the power receive mode and the power conserve mode, and a zero-voltage-switching condition can be provided to the switches Q1-Q4. Moreover, the signals PWM1 and PWM2 can have the same pulse width and the same frequency, and therefore each of the switches Q1-Q4 can be turned on and off alternately with a 50% switching duty cycle.

Figure 10:
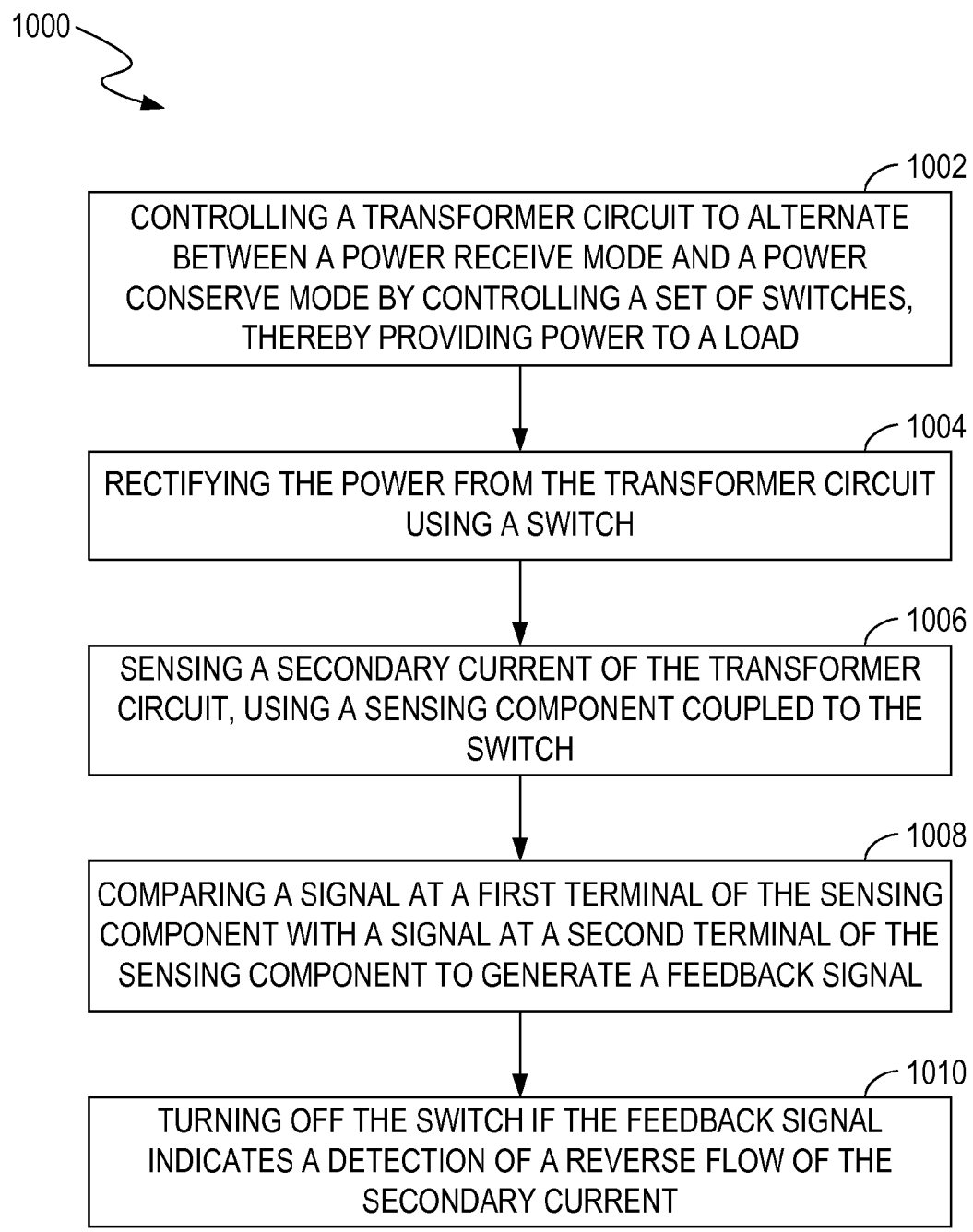
FIG. 10 illustrates a flowchart of a method for controlling a DC/DC converter, in an embodiment according to the present invention.

FIG. 10 illustrates a flowchart 1000 of a method for controlling a DC/DC converter 200, in an embodiment according to the present invention. FIG. 10 is described in combination with FIG. 2, FIG. 3, FIG. 4, FIG. 5A, FIG. 5B, FIG. 5C, FIG. 6, and FIG. 7.

At step 1002, the controller 202 (in FIG. 2 or FIG. 4) controls the transformer circuit 320 to alternate between a power receive mode and a power conserve mode by controlling switches Q1-Q4, such that the transformer circuit 320 provides power, e.g., a secondary current $I_S$, to a load 308.

At step 1004, the rectifying circuit 314 (in FIG. 3) rectifies the power from the transformer circuit 320 using the rectifying switches S1 and S2.

At step 1006, the sensing resistor $R_{SEN}$ in the feedback circuit 316 (in FIG. 3) senses the secondary current $I_S$ of the transformer circuit 320.

At step 1008, the comparator 318 in the feedback circuit 316 compares a signal at a first terminal of the sensing resistor $R_{SEN}$ with a signal at a second terminal of the sensing resistor $R_{SEN}$ to generate a feedback signal.

At step 1010, the second logic unit 4062 (in FIG. 4 or FIG. 5C) turns off the rectifying switches S1 and S2 if the feedback signal FB indicates a detection of a reverse flow of the secondary current $I_S$ (e.g., from the load 308 to ground through the inductor L2, the secondary winding, and the sensing resistor $R_{SEN}$).

As a result, the second logic unit 4062 cooperated with the feedback circuit 316 can protect the DC/DC converter 200 from damages caused by a reverse secondary current of the transformer circuit 320.

In summary, embodiments according to the present invention provide DC/DC converters that use controllers to control full-bridge switching circuits and transformer circuits. In one embodiment, the controller can control output power of the DC/DC converter by controlling a switching frequency of the switching circuits, thus reducing switching losses, improving efficiency of power conversion, and regulating an output voltage of the DC/DC converter to a target level within a relatively wide range. The controller can also control a primary current of the transformer circuit to have a substantially constant ripple magnitude. The controller can also provide a zero-voltage-switching condition for the switches. Furthermore, the controller can protect the DC/DC converter from damage caused by a reverse secondary current of the transformer circuit. A DC/DC converter according to the present invention is applicable in various products. For example, it can be used in Electrical Vehicle chargers and other power converters with high current/voltage outputs.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for a DC/DC converter, said controller comprising:
   a signal generator operable for transferring pulses of a PWM (pulse width modulation) signal to a first channel and a second channel alternately thereby generating a first pulse signal at said first channel and a second pulse signal at said second channel alternately, and operable for controlling said PWM signal to regulate an output of said DC/DC converter; and
   control circuitry, coupled to said signal generator, operable for controlling a plurality of switches including a first switch, a second switch, a third switch, and a fourth switch according to said first and second pulse signals, wherein said controlling comprises:
      turning off said third switch in response to detecting a first edge of said first pulse signal, and turning on said first switch after a predetermined delay from said detecting of said first edge,
      turning off said fourth switch in response to detecting a second edge of said first pulse signal, and turning on said second switch after a predetermined delay from said detecting of said second edge,
      turning off said first switch in response to detecting a third edge of said second pulse signal and turning on said third switch after a predetermined delay from said detecting of said third edge, and
      turning off said second switch in response to detecting a fourth edge of said second pulse signal and turning on said fourth switch after a predetermined delay from detecting of said fourth edge,
   wherein said control circuitry is operable for generating a plurality of driving signals according to said first and second pulse signals, and each driving signal of said driving signals has a turn-on status to turn on a corresponding switch in said switches and a turn-off status to turn off said corresponding switch,
   and wherein said control circuitry further comprises:
   a plurality of delay units, comprising a first delay unit, a second delay unit, a third delay unit, and a fourth delay unit, operable for generating said driving signals according to a plurality of logic outputs, each logic output of said logic outputs having a first level and a second level,
   wherein said first delay unit is operable for setting a first driving signal of said driving signals to said turn-on status after a predetermined delay from detecting that a first logic output of said logic outputs is at said first level, and setting said first driving signal to said turn-off status in response to detecting that said first logic output is at said second level,
   wherein said second delay unit is operable for setting a second driving signal of said driving signals to said turn-on status after a predetermined delay from detecting that a second logic output of said logic outputs is at said first level, and setting said second driving signal to said turn-off status in response to detecting that said second logic output is at said second level,
   wherein said third delay unit is operable for setting a third driving signal of said driving signals to said turn-on status after a predetermined delay from detecting that a third logic output of said logic outputs is at said first level, and setting said third driving signal to said turn-off status in response to detecting that said third logic output is at said second level,
   and wherein said fourth delay unit is operable for setting a fourth driving signal of said driving signals to said turn-on status after a predetermined delay from detecting that a fourth logic output of said logic outputs is at said first level, and setting said fourth driving signal to said turn-off status in response to detecting that said fourth logic output is at said second level.

2. The controller as claimed in claim 1, wherein said first and second pulse signals derive from the same PWM signal thereby controlling said driving signals to have a 50% duty cycle.

3. The controller as claimed in claim 1, wherein said control circuitry further comprises:
   logic circuitry, coupled to said delay units, operable for generating said logic outputs, setting said first logic output to said second level and said second logic output to said first level in response to detecting said first edge, setting said third logic output to said second level and said fourth logic output to said first level in response to detecting said second edge, setting said first logic output to said first level and said second logic output to said second level in response to detecting said third edge, and setting said third logic output to said first level and said fourth logic output to said second level in response to detecting said fourth edge.

4. The controller as claimed in claim 1, wherein said control circuitry is operable for controlling a transformer circuit to operate in a power receive mode by controlling said switches when said PWM signal is at a first logic level, and to operate in a power conserve mode by controlling said switches when said PWM signal is at a second logic level, and wherein said signal generator comprises a timer to control a time period during which said PWM signal is at said first logic level to be inversely proportional to an input voltage provided to said transformer circuit.

5. The controller as claimed in claim 1, wherein control circuitry is operable for controlling a transformer circuit to alternate between a power receive mode and a power conserve mode at an alternation frequency by controlling said switches, and wherein said control circuitry comprises a frequency control circuit to adjust said alternation frequency according to said output of said DC/DC converter.

6. A method for controlling a DC/DC converter, said method comprising:
transferring pulses of a PWM (pulse width modulation) signal to a first channel and a second channel alternately thereby generating a first pulse signal at said first channel and a second pulse signal at said second channel alternately, using a signal generator;
controlling said PWM signal to regulate an output of said DC/DC converter; and
controlling a plurality of switches including a first switch, a second switch, a third switch, and a fourth switch according to said first and second pulse signals, using control circuitry coupled to said signal generator, wherein said controlling of said switches comprises:
turning off said third switch in response to detecting a first edge of said first pulse signal, and turning on said first switch after a predetermined delay from said detecting of said first edge,
turning off said fourth switch in response to detecting a second edge of said first pulse signal, and turning on said second switch after a predetermined delay from said detecting of said second edge,
turning off said first switch in response to detecting a third edge of said second pulse signal and turning on said third switch after a predetermined delay from said detecting of said third edge, and
turning off said second switch in response to detecting a fourth edge of said second pulse signal and turning on said fourth switch after a predetermined delay from said detecting of said fourth edge,
wherein said controlling of said switches further comprises:
generating a plurality of driving signals according to said first and second pulse signals and a plurality of logic outputs, each driving signal of said driving signals having a turn-on status to turn on a corresponding switch in said switches and a turn-off status to turn off said corresponding switch, and each logic output of said logic outputs having a first level and a second level;
setting a first driving signal of said driving signals to said turn-on status after a predetermined delay from detecting that a first logic output of said logic outputs is at said first level;
setting said first driving signal to said turn-off status in response to detecting that said first logic output is at said second level;
setting a second driving signal of said driving signals to said turn-on status after a predetermined delay from detecting that a second logic output of said logic outputs is at said first level;
setting said second driving signal to said turn-off status in response to detecting that said second logic output is at said second level;
setting a third driving signal of said driving signals to said turn-on status after a predetermined delay from detecting that a third logic output of said logic outputs is at said first level;
setting said third driving signal to said turn-off status in response to detecting that said third logic output is at said second level;
setting a fourth driving signal of said driving signals to said turn-on status after a predetermined delay from detecting that a fourth logic output of said logic outputs is at said first level; and
setting said fourth driving signal to said turn-off status in response to detecting that said fourth logic output is at said second level.

7. The method as claimed in claim 6, wherein said controlling of said switches further comprises:
setting a first logic output of said logic outputs to said second level and a second logic output of said logic outputs to said first level in response to detecting said first edge;
setting a third logic output of said logic outputs to said second level and a fourth logic output of said logic outputs to said first level in response to detecting said second edge;
setting said first logic output to said first level and said second logic output to said second level in response to detecting said third edge; and
setting said third logic output to said first level and said fourth logic output to said second level in response to detecting said fourth edge.

8. The method as claimed in claim 6, further comprising:
controlling a transformer circuit to operate in a power receive mode by controlling said switches when said PWM signal is at a first logic level;
controlling said transformer circuit to operate in a power conserve mode by controlling said switches when said PWM signal is at a second logic level; and
controlling a time period during which said PWM signal is at said first logic level to be inversely proportional to an input voltage provided to said transformer circuit.

9. The method as claimed in claim 6, further comprising:
controlling a transformer circuit to alternate between a power receive mode and a power conserve mode at an alternation frequency by controlling said switches; and
adjusting said alternation frequency according to said output of said DC/DC converter.

10. A DC/DC converter comprising:
a plurality of switches, comprising a first switch, a second switch, a third switch, and a fourth switch, operable for controlling a transformer circuit; and
a controller, coupled to said switches, operable for: transferring pulses of a PWM (pulse width modulation) signal to a first channel and a second channel alternately thereby generating a first pulse signal at said first channel and a second pulse signal at said second channel alternately; controlling said PWM signal to regulate an output of said DC/DC converter; turning off said third switch in response to detecting a first edge of said first pulse signal, and turning on said first switch after a predetermined delay from said detecting of said first edge; turning off said fourth switch in response to detecting a second edge of said first pulse signal, and turning on said second switch after a predetermined delay from said detecting of said second edge; turning off said first switch in response to detecting a third edge of said second pulse signal and turning on said third switch after a predetermined delay from said detecting of said third edge; and turning off said second switch in response to detecting a fourth edge of said second pulse signal and turning on said fourth switch after a predetermined delay from said detecting of said fourth edge, wherein said controller is operable for generating a plurality of driving signals according to said first and second pulse signals, and each driving signal of said driving signals has a turn-on status to turn on a corresponding switch in said switches and a turn-off status to turn off said corresponding switch, and wherein said controller further comprises:

a plurality of delay units, comprising a first delay unit, a second delay unit, a third delay unit, and a fourth delay unit, operable for generating said driving signals according to a plurality of logic outputs, each logic output of said logic outputs having a first level and a second level, wherein said first delay unit is operable for setting a first driving signal of said driving signals to said turn-on status after a predetermined delay from detecting that a first logic output of said logic outputs is at said first level, and setting said first driving signal to said turn-off status in response to detecting that said first logic output is at said second level, wherein said second delay unit is operable for setting a second driving signal of said driving signals to said turn-on status after a predetermined delay from detecting that a second logic output of said logic outputs is at said first level, and setting said second driving signal to said turn-off status in response to detecting that said second logic output is at said second level, wherein said third delay unit is operable for setting a third driving signal of said driving signals to said turn-on status after a predetermined delay from detecting that a third logic output of said logic outputs is at said first level, and setting said third driving signal to said turn-off status in response to detecting that said third logic output is at said second level, and wherein said fourth delay unit is operable for setting a fourth driving signal of said driving signals to said turn-on status after a predetermined delay from detecting that a fourth logic output of said logic outputs is at said first level, and setting said fourth driving signal to said turn-off status in response to detecting that said fourth logic output is at said second level.

11. The DC/DC converter as claimed in claim 10, wherein said transformer circuit is coupled between a connection node of said first and third switches and a connection node of said second and fourth switches.

12. The DC/DC converter as claimed in claim 10, wherein said first and second pulse signals derive from the same PWM signal thereby controlling said driving signals to have a 50% duty cycle.

13. The DC/DC converter as claimed in claim 10, wherein said controller further comprises:

logic circuitry, coupled to said delay units, operable for generating said logic outputs, setting a first logic output of said logic outputs to said second level and a second logic output of said logic outputs to said first level in response to said detecting of said first edge, setting a third logic output of said logic outputs to said second level and a fourth logic output of said logic outputs to said first level in response to said detecting of said second edge, setting said first logic output to said first level and said second logic output to said second level in response to said detecting of said third edge, and setting said third logic output to said first level and said fourth logic output to said second level in response to said detecting of said fourth edge.

14. The DC/DC converter as claimed in claim 10, wherein said controller controls said transformer circuit to operate in a power receive mode by controlling said switches when said PWM signal is at a first logic level, and to operate in a power conserve mode by controlling said switches when said PWM signal is at a second logic level, and wherein said controller comprises a timer to control a time period during which said PWM signal is at said first logic level to be inversely proportional to an input voltage provided to said transformer circuit.

15. The DC/DC converter as claimed in claim 10, wherein controller controls said transformer circuit to alternate between a power receive mode and a power conserve mode at an alternation frequency by controlling said switches, and wherein said controller comprises a frequency control circuit to adjust said alternation frequency according to said output of said DC/DC converter.

* * * * *